(12) United States Patent
Goto

(10) Patent No.: US 10,331,602 B2
(45) Date of Patent: Jun. 25, 2019

(54) SEMICONDUCTOR INTEGRATED CIRCUIT HAVING DIFFERENT OPERATION MODES AND DESIGN METHOD THEREOF

(71) Applicant: MIE FUJITSU SEMICONDUCTOR LIMITED, Kuwana-shi, Mie (JP)

(72) Inventor: Seiji Goto, Kunitachi (JP)

(73) Assignee: MEI FUJITSU SEMICONDUCTOR LIMITED, Kuwana (JP)

( * ) Notice: Subject to any disclaimer, the term of this patent is extended or adjusted under 35 U.S.C. 154(b) by 117 days.

(21) Appl. No.: 15/448,910

(22) Filed: Mar. 3, 2017

(65) Prior Publication Data
US 2017/0293583 A1 Oct. 12, 2017

(30) Foreign Application Priority Data

Apr. 12, 2016 (JP) ................... 2016-079493

(51) Int. Cl.
| | | |
|---|---|---|
| *G06F 3/00* | (2006.01) | |
| *G06F 13/40* | (2006.01) | |
| *H04L 12/00* | (2006.01) | |
| *G06F 13/36* | (2006.01) | |
| *G06F 17/50* | (2006.01) | |

(52) U.S. Cl.
CPC .......... *G06F 13/4022* (2013.01); *G06F 13/36* (2013.01); *G06F 17/5072* (2013.01); *G06F 2217/02* (2013.01); *G06F 2217/84* (2013.01)

(58) Field of Classification Search
CPC .............. G06F 3/00; G06F 13/40; H04L 12/00
See application file for complete search history.

(56) References Cited

U.S. PATENT DOCUMENTS

| | | | |
|---|---|---|---|
| 5,602,406 A | 2/1997 | Okabe | |
| 6,184,702 B1 * | 2/2001 | Takahashi | ........... H01L 23/5222 |
| | | | 257/659 |
| 6,262,614 B1 | 7/2001 | Sasaki | |
| 2004/0145033 A1 | 7/2004 | McElvain | |
| 2004/0183581 A1 | 9/2004 | Yasui et al. | |
| 2007/0120245 A1 | 5/2007 | Yoshikawa et al. | |
| 2007/0245194 A1 | 10/2007 | Nakamura | |
| 2010/0079168 A1 * | 4/2010 | Tashiro | .......... G01R 31/318538 |
| | | | 326/93 |

FOREIGN PATENT DOCUMENTS

| | | |
|---|---|---|
| JP | 5-174599 A | 7/1993 |
| JP | 6-77403 A | 3/1994 |
| JP | 2000-40701 A | 2/2000 |

(Continued)

*Primary Examiner* — David E Martinez
(74) *Attorney, Agent, or Firm* — Westerman, Hattori, Daniels & Adrian, LLP

(57) ABSTRACT

A semiconductor integrated circuit includes a bus signal line and a test signal line arranged adjacent to the bus signal line. The semiconductor integrated circuit has a system mode, which is an operation mode that uses the bus signal line, and a scan mode, which is an operation mode that uses the test signal line. The semiconductor integrated circuit fixes the logic level of the test signal line adjacent to the bus signal line in the system mode that uses the bus signal line. The semiconductor integrated circuit fixes the logic level of the bus signal line adjacent to the test signal line in the scan mode that uses the test signal line.

15 Claims, 27 Drawing Sheets

(56) References Cited

FOREIGN PATENT DOCUMENTS

| | | |
|---|---|---|
| JP | 2000-236066 A | 8/2000 |
| JP | 2001-24172 A | 1/2001 |
| JP | 2001-68553 A | 3/2001 |
| JP | 2004-119921 A | 4/2004 |
| JP | 2004-286540 A | 10/2004 |
| JP | 2005-535118 A | 11/2005 |
| JP | 2006-106838 A | 4/2006 |
| JP | 2006-114799 A | 4/2006 |
| JP | 2007-149826 A | 6/2007 |
| JP | 2007-149977 A | 6/2007 |
| JP | 2007-256146 A | 10/2007 |
| JP | 2009-239316 A | 10/2009 |

* cited by examiner

SCANCHAINS 472:

-<Scan Chain Name>
+ START <Instance Name> <Output Terminal Name>
<Scan-FF Instance Name> (IN <Scan In Terminal Name>) (Out <Scan Out Terminal Name>)
. .
. .
+ STOP <Instance Name> <Output Terminal Name>

-<Scan Chain Name>
+ START <Instance Name> <Output Terminal Name>
<Scan-FF Instance Name> (IN <Scan In Terminal Name>) (Out <Scan Out Terminal Name>)
. .
. .

END SCANCHAINS

FIG. 10

SEMICONDUCTOR INTEGRATED CIRCUIT HAVING DIFFERENT OPERATION MODES AND DESIGN METHOD THEREOF

CROSS-REFERENCE TO RELATED APPLICATION

This application is based upon and claims the benefit of priority of the prior Japanese Patent Application No. 2016-079493, filed on Apr. 12, 2016, the entire contents of which are incorporated herein by reference.

FIELD

The embodiments discussed herein relate to a semiconductor integrated circuit and a design method thereof.

BACKGROUND

There are various known techniques for reducing the crosstalk that occurs between adjacent signal lines. In one technique, a signal line, i.e., a signal line used in a diagnostic operation mode, is arranged between bus signal lines, and the logic level of this signal line is fixed at a low or high level in a normal operation mode in which the bus signal lines are used. In another technique, a clock signal line is arranged between either a GND line or a VDD line (a power supply line) and a scan signal line. In still another technique, a clock signal line is arranged between power supply lines. See, for example, the following literatures.

Japanese Laid-open Patent Publication No. 2004-119921
Japanese Laid-open Patent Publication No. 2001-24172
Japanese Laid-open Patent Publication No. 2000-236066

In a semiconductor integrated circuit, crosstalk could occur between signal lines used for signal transmission in a system mode (a normal operation mode). Crosstalk could also occur between test, signal lines used for signal transmission in a scan mode (a diagnostic operation mode, a test mode, or the like). Such crosstalk that occurs in the system mode or the scan mode could cause a signal delay, a variation thereof, a timing error, or an incorrect operation. Consequently, the performance and the quality of the semiconductor integrated circuit could be deteriorated.

SUMMARY

According to one aspect, there is provided a semiconductor integrated circuit including: a first bus signal line; and a first test signal line arranged adjacent to the first bus signal line, wherein the semiconductor integrated circuit, includes a system mode, which is an operation mode that uses the first, bus signal line, and a scan mode, which is an operation mode that uses the first test signal line, and wherein a logic level of the first test signal line is fixed in the system mode, and a logic level of the first bus signal line is fixed in the scan mode.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates an example of scan chain information;

DESCRIPTION OF EMBODIMENTS

First, examples of the existing crosstalk reduction techniques will be described with reference to FIGS. 1A to 1C.

Figure 1A:
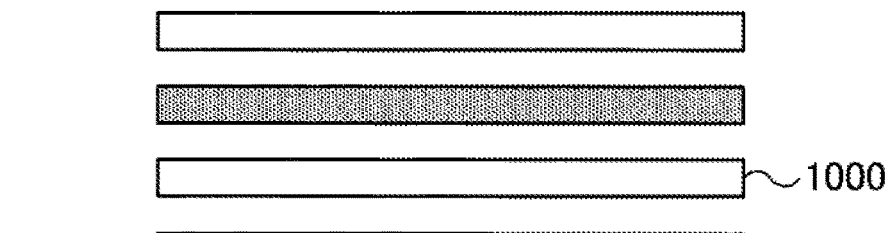
FIGS. 1A to 1C illustrate examples of crosstalk reduction techniques.

FIG. 1A illustrates an example technique in which shield lines are used.

In one crosstalk reduction technique, as illustrated in FIG. 1A, a power supply line 1100 whose potential level is set to VDD or VSS is arranged adjacent to bus signal lines 1000. By arranging a power supply line 1100 adjacent to bus signal lines 1000 in this way, the coupling capacitance between the bus signal lines 1000 arranged to sandwich the power supply line 1100 is reduced, and the crosstalk, therebetween is reduced.

Figure 1B:
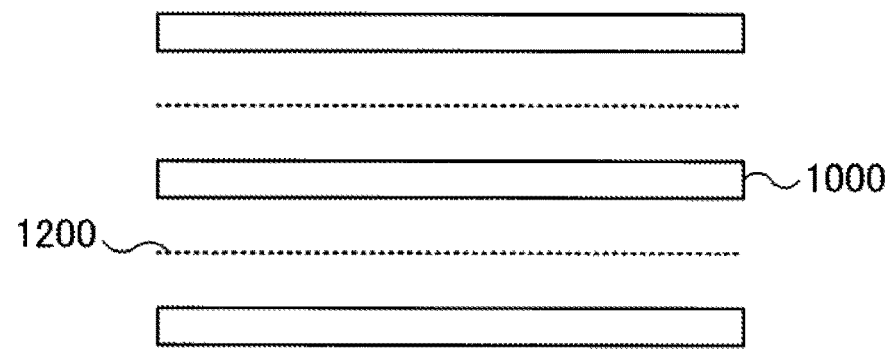

FIG. 1B illustrates an example technique in which additional spacing is used.

As another crosstalk reduction technique, as illustrated in FIG. 1B, an unwired track 1200, on which no wiring is arranged, is arranged between bus signal lines 1000. By arranging an unwired track 1200 between bus signal lines 1000 to form space therebetween in this way, the coupling capacitance between the adjacent bus signal lines 1000 is reduced, and the crosstalk therebetween is reduced.

Figure 1C:
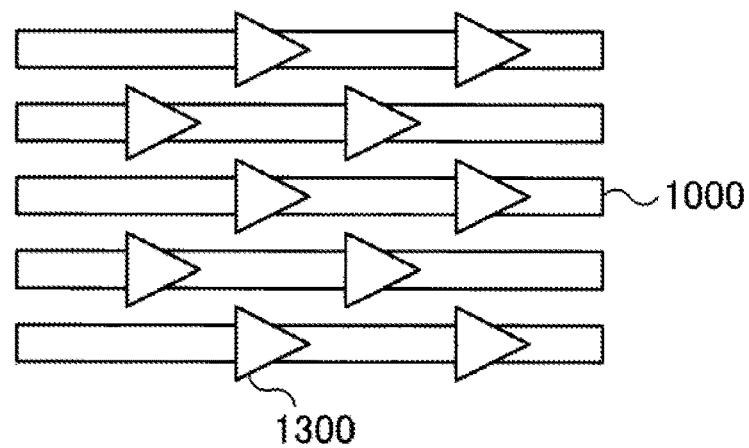

FIG. 1C illustrates an example technique in which buffers are inserted.

As still another crosstalk reduction technique, as illustrated in FIG. IC, at least one buffer 1300 is inserted in a bus signal line 1000. By inserting a buffer 1300 in a bus signal line 1000 and shortening the line length, the crosstalk between adjacent bus signal lines 1000 is reduced.

The crosstalk reduction techniques as illustrated in FIGS. 1A to 1C are effective to some extent. For example, the technique illustrated in FIG. 1A is effective in reducing crosstalk, a signal delay caused thereby, and a variation thereof, and in improving the timing QoR (Quality of Result). However, to arrange a power supply line 1100 adjacent to an individual bus signal line 1000, restrictions could be caused on the layout or extra line resources could be needed, for example. Thus, the line property could be deteriorated.

The technique illustrated in FIG. 1B is also effective to some extent in reducing crosstalk, a signal delay caused thereby, and a variation thereof, and in improving the timing QoR, However, to arrange an individual unwired track 1200, restrictions could be caused on the arrangement of other wirings, for example. Thus, the line property could be deteriorated, In addition, the technique illustrated in FIG. 1C is also effective to some extent in reducing crosstalk, a signal delay caused thereby, and a variation thereof. However, since redundant buffers need to be inserted, the line property and the timing QoR could be deteriorated.

In a semiconductor integrated circuit, bus signal lines as described above are used for signal transmission between circuit modules including a group of cells such as flip flops (FF). The semiconductor integrated circuit uses these bus signal lines to perform its normal operation.

In addition to a system mode (a normal operation mode), which is an operation mode in which the semiconductor integrated circuit performs the normal operation by using the bus signal lines, the semiconductor integrated circuit could have a scan mode (a test mode), which is an operation mode in which the semiconductor integrated circuit performs a scan test by using test signal lines.

Figure 2:
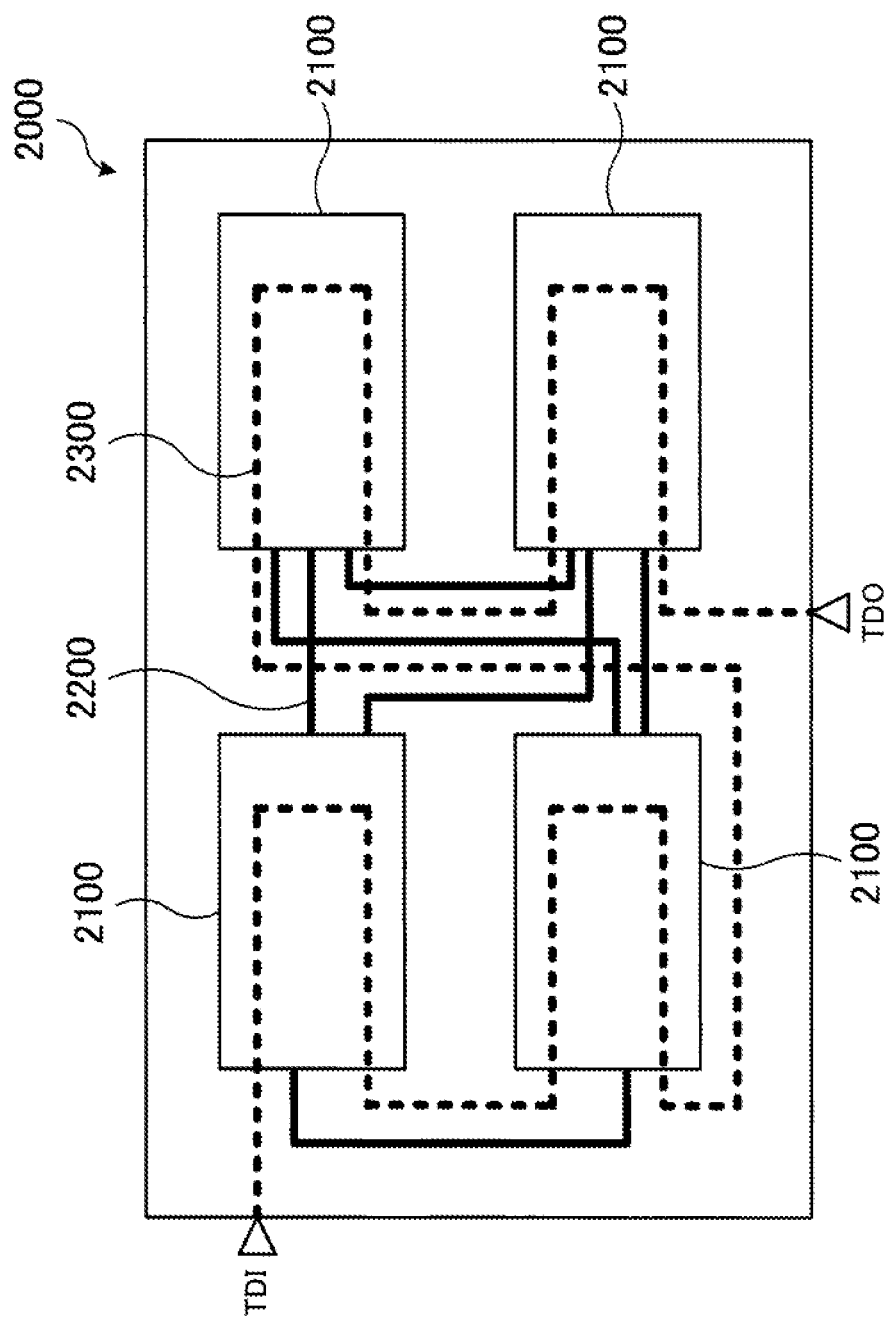
FIG. 2 illustrates an example of a semiconductor integrated circuit.

FIG. 2 illustrates an example of a semiconductor integrated circuit. FIG. 2 is a plan view illustrating main portions of an example of a semiconductor integrated circuit.

A semiconductor integrated circuit 2000 illustrated in FIG. 2 includes a plurality of circuit modules 2100 (for example, four circuit modules 2100). For example, when designing the semiconductor integrated circuit 2000, an individual circuit module 2100 is arranged as a hierarchy layout, block (HLB). To perform signal transmission between different circuit modules 2100 in a system mode, for example, the semiconductor integrated circuit 2000 includes bus signal lines 2200 illustrated by solid lines in FIG. 2. An individual bus signal line 2200 illustrated by a solid line in FIG. 2 may be a group of many bus signal lines.

In addition to the system mode using the bus signal lines 2200, the semiconductor integrated circuit 2000 could have a scan mode for performing a scan test. In this case, for example, the semiconductor integrated circuit 2000 may include a test signal line 2300 illustrated as a dotted line in FIG. 2. The test signal line 2300 illustrated as a dotted line in FIG. 2 may be a group of many test signal lines.

For example, the test signal lines 2300 includes a scan chain (a scan path) in which scan FFs are connected in a chain. This scan chain is formed by inserting a multiplexer to an input of a group of FFs in an individual circuit module 2100 so that the scan FFs can be switched by a predetermined signal. In the scan mode, the semiconductor integrated circuit 2000 performs a scan test by receiving a signal via an input terminal TDI of the scan chain and detecting a signal outputted via an output terminal TDO.

The test signal line used in the scan mode of the semiconductor integrated circuit is arranged to connect the circuit modules and a group of FFs in each of the circuit modules, as described above. Various kinds of test signal are transmitted via this test signal line. For examples, these test signals may include scan chain information including information about connection of a group of FFs and TDI-TDO chain information including information about the input and output terminals (TDI-TDO) of the scan chain. In addition, examples of the test signals include a test control signal for controlling the switching to the scan mode, test serial connection signals such as a scan mode signal, a test mode signal, an IJTAG signal inputted to a group of FFs, and a control signal for these signals.

When the semiconductor integrated circuit operates in the system mode, crosstalk could occur between bus signal lines used for signal transmission in the system mode. When the semiconductor integrated circuit operates in the scan mode, crosstalk could also occur between test signal lines used for signal transmission in the scan mode. When the system operates in the scan mode, crosstalk could also occur between a test signal line and a bus signal line. The crosstalk that occurs in the system mode could deteriorate the performance and quality of the semiconductor integrated circuit. In addition, the crosstalk that occurs in the scan mode could affect the result of the scan test and could deteriorate the performance and quality of semiconductor integrated circuit manufactured on the basis of the test result.

The crosstalk reduction techniques as illustrated in FIGS. 1A to 1C are applicable to the bus signal lines and test signal lines of a semiconductor integrated circuit. However, as described above, application of any one of the above crosstalk reduction techniques could deteriorate the line property and the timing QoR.

Thus, there is provided a high-performance and high-quality semiconductor integrated circuit that enables reduction of the crosstalk that occurs in system mode and scan mode by using techniques described as the following embodiments.

Hereinafter, several embodiments will be described below with reference to the accompanying drawings, wherein like reference characters refer to like elements throughout. First, a first embodiment will be described.

Figure 3:
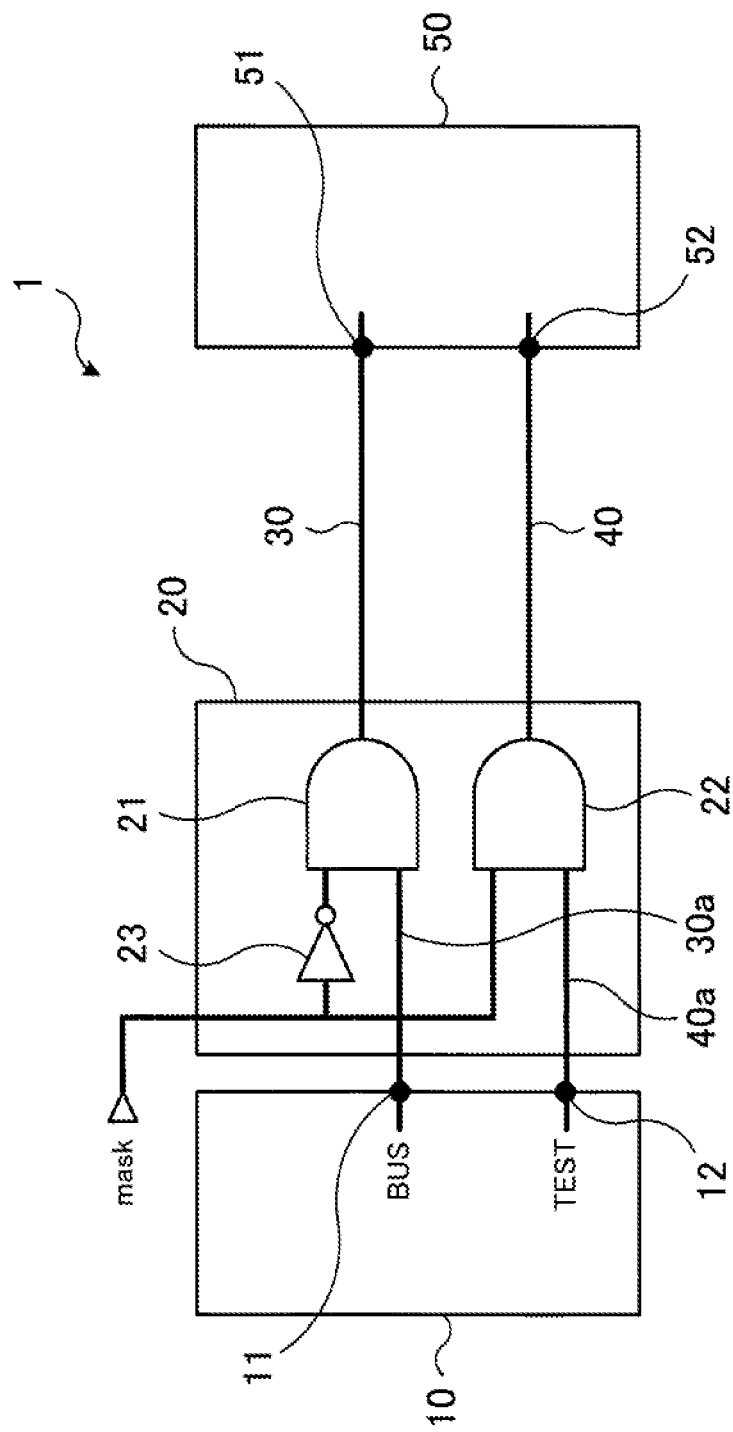
FIG. 3 illustrates an example of a semiconductor integrated circuit according to a first embodiment.

FIG. 3 illustrates an example of a semiconductor integrated circuit according to the first embodiment.

A semiconductor integrated circuit 1 illustrated in FIG. 3 includes a circuit module 10, a mode switching unit. 20, a bus signal line 30, a test signal line 40, and a circuit module 50.

Each of the circuit module 10 and the circuit module 50 includes a group of cells such as FFs (not illustrated).

The circuit module 10 includes a bus signal terminal 11 (an output terminal) connected to the bus signal line 30 via the mode switching unit 20 and a test, signal terminal 12 (an output, terminal) connected to the test signal line 40 via the mode switching unit 20. The bus signal terminal II and the test signal terminal 12 are arranged adjacent to each other.

The circuit module 50 includes a bus signal terminal 51 (an input terminal) connected to the bus signal line 30 and a test signal terminal 52 (an input terminal) connected to the test signal line 40. The bus signal terminal 51 and the test signal terminal 52 are arranged adjacent to each other.

The mode switching unit 20 includes a logic circuit for switching the operation mode of the semiconductor integrated circuit 1 between the scan mode and the system mode on the basis of a mask signal mask inputted to the mode switching unit 20. The mode switching unit 20 is arranged between the bus signal terminals 11 and 51 and between the test signal terminals 12 and 52. For example, the mode switching unit 20 is arranged near the circuit module 10.

For example, as illustrated in FIG. 3, the mode switching unit 20 includes an AND gate 21 connected to the bus signal line 30 and an AND gate 22 connected to the test signal line 40.

The AND gate 21 receives a bus signal BUS outputted to a bus signal line 30a from the bus signal terminal 11 of the circuit module 10 and a signal obtained by an inverter 23 inverting the mask signal mask. The AND gate 21 outputs the logical product of these signals to the bus signal line 30. This output from the AND gate 21 is supplied to the bus signal terminal 51 of the circuit module 50 via the bus signal line 30.

The AND gate 22 receives a test signal TEST outputted to a test, signal line 40a from the test signal terminal 12 of the circuit module 10 and the mask signal mask. The AND gate 22 outputs the logical product of these signals to the test signal line 40. This output from the AND gate 22 is supplied to the test signal terminal 52 of the circuit module 50 via the test signal line 40.

When the semiconductor integrated circuit 1 having the above configuration is in the system mode in which signal transmission, is performed by using the bus signal line 30, the logic level of the test signal line 40 is fixed. In contrast, when the semiconductor integrated circuit 1 is in the scan mode in which signal transmission is performed by using the test signal line 40, the logic level of the bus signal line 30 is fixed.

Figure 4A:
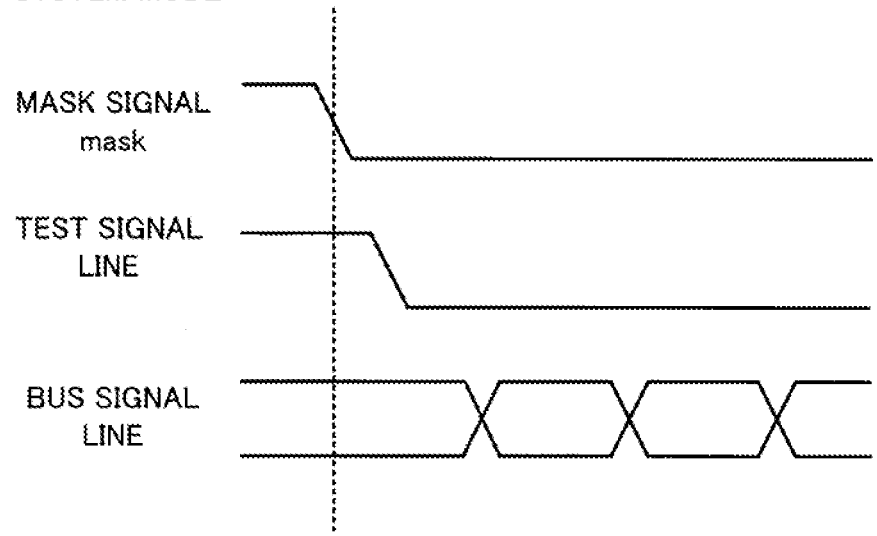
FIGS. 4A and 4B illustrate signal waveforms of the semiconductor integrated circuit according to the first embodiment.
Figure 4B:
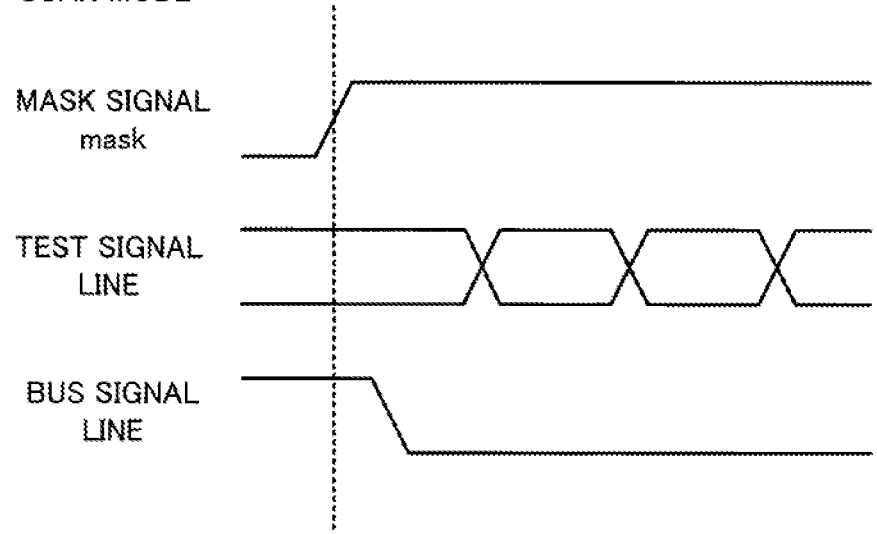

FIGS. 4A and 4B illustrate signal waveforms of the semiconductor integrated circuit according to the first embodiment. FIG. 4A illustrates signal waveforms in the system mode, and FIG. 4B illustrates signal waveforms in the scan mode.

First, signal waveforms observed when the semiconductor integrated circuit 1 is in the system mode will be described with reference to FIGS. 3 and 4A.

When the operation mode of the semiconductor integrated circuit 1 is switched to the system mode, for example, the mask signal mask supplied to the mode switching unit 20 is set to the Low (L) level (see the top waveform in FIG. 4A). For example, a scan mode signal or a test mode signal set to the L level in the system mode and the H level in the scan mode is used as the mask signal mask.

When the mask signal mask, is set to the L level, one of the two inputs of the AND gate 21 connected to the bus signal line 30 is inverted by the inverter 23 and is thus set to the High (H) level. Consequently, the output from the AND gate 21, namely, the signal level of the bus signal line 30, changes depending on the signal level (L or E) of the bus signal terminal 11 (the bus signal line 30a) (see the bottom waveform in FIG. 4A). In contrast, when the mask signal mask is set to the L level, one of the two inputs of the AND gate 22 connected to the test signal line 40 is set to the L level. Consequently, the output from the AND gate 22, namely, the test signal line 40, is fixed at the L level (see the middle waveform in FIG. 4A).

Thus, since the logic level of the test signal line 40 arranged adjacent to bus signal line 30 is fixed at the L level in the system mode, the crosstalk involving the bus signal line 30 is reduced.

Next, signal waveforms observed when the semiconductor integrated circuit 1 is in the scan mode will be described with reference to FIGS. 3 and 4B.

When the operation mode of the semiconductor integrated circuit 1 is switched to the scan mode, for example, the mask signal mask supplied to the mode switching unit 20 is set to the H level (see the top waveform in FIG. 4B). For example, a scan mode signal or a test mode signal set to the L level in the system mode and the H level in the scan mode is used as the mask signal mask.

When the mask signal mask is set to the H level, one of the two inputs of the AND gate 21 connected to the bus signal line 30 is inverted by the inverter 23 and is thus set to the L level. Consequently, the output from the AND gate 21, namely, the signal level of the bus signal line 30, is fixed at the L level (see the bottom waveform in FIG. 4B). In contrast, when the mask signal mask is set to the H level, one of the two inputs of the AND gate 22 connected to the test signal line 40 is set to the H level. Consequently, the output from the AND gate 22, namely, the test signal line 40, changes depending on the signal level (L or H) of the test signal terminal 12 (the test signal line 40a) (see the middle waveform in FIG. 4B).

Thus, since the logic level of the bus signal line 30 arranged adjacent to test signal line 40 is fixed at the L level in the scan mode, the crosstalk involving the test signal line 40 is reduced.

The configuration of the mode switching unit 20 is not limited to that illustrated in FIG. 3.

For example, while the inverter 23 is connected to one input, of the AND gate 21 in FIG. 3, an inverter may alternatively be connected to one input of the AND gate 22 in FIG. 3. In this case, by setting the mask signal mask to the H level, the semiconductor integrated circuit 1 is set in the system mode, and the logic level of the test signal line 40 is fixed at the L level. In addition, by setting the mask signal mask to the L level, the semiconductor integrated circuit 1 is set in the scan mode, and the logic level of the bus signal line 30 is fixed at the L level.

Instead of the AND gates 21 and 22 in FIG. 3, an OR gate may be used. In this case, by setting the mask signal mask to the H level, the semiconductor integrated circuit 1 is set to the system mode, and the logic level of the test signal line 40 is fixed at. the H level. In addition, by setting the mask signal mask to the L level, the semiconductor integrated circuit 1 is set to the scan mode, and the logic level of the bus signal line 30 is fixed at the H level.

In addition, instead of the AND gates 21 and 22 in FIG. 3, NAND or NOR gates may be used. In this case, an inverter may be combined with them.

The mode switching unit 20 may include any logic circuit in which the logic level of one of the bus signal line 30 and the test signal line 40 is fixed at the L or H level and the logic level of the other signal line is not fixed when the mask signal mask is set to the L or H level.

In addition, while the mode switching unit 20 is arranged near the circuit module 10 in FIG. 3, the mode switching unit 20 may be arranged in the circuit module 10.

Figure 5:
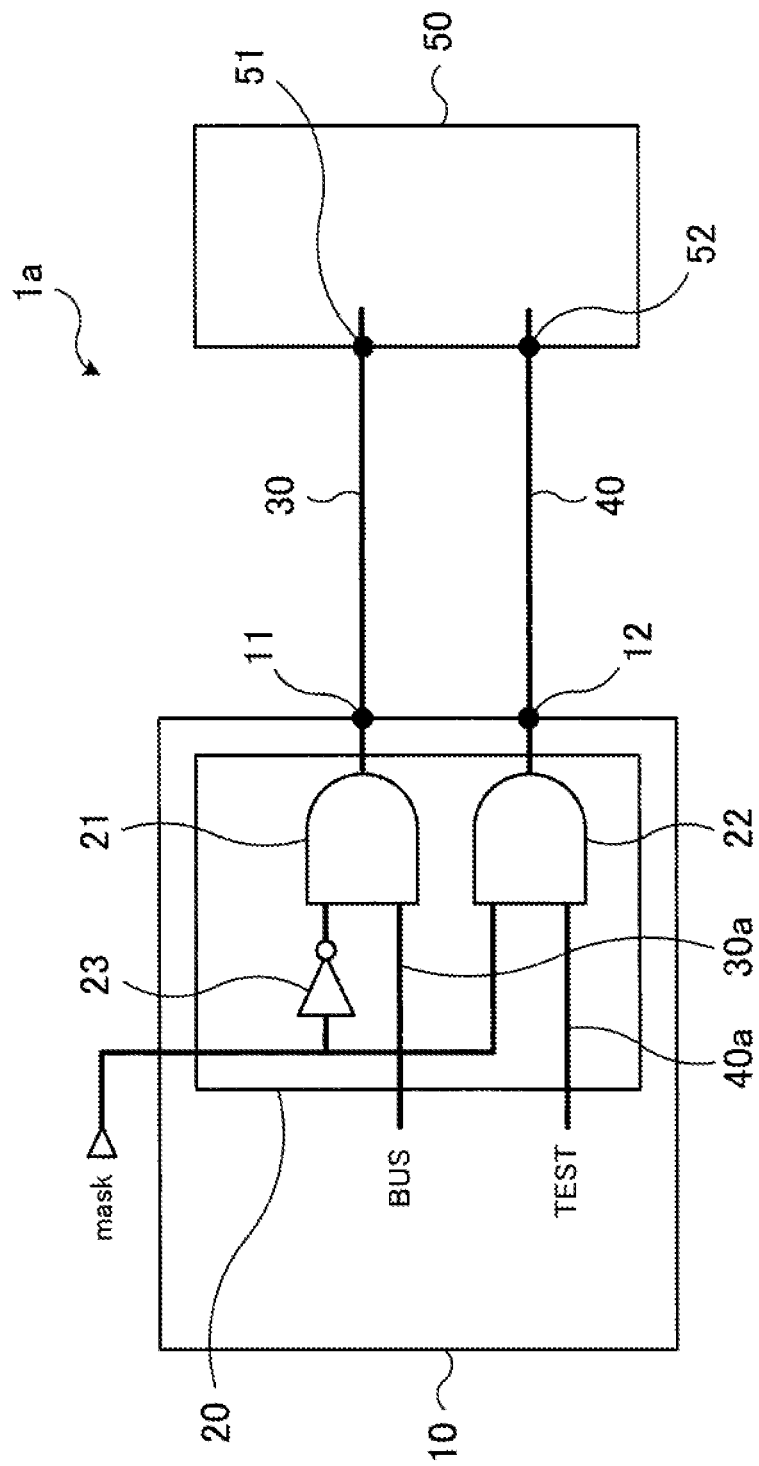
FIG. 5 illustrates a semiconductor integrated circuit according to a variation of the first embodiment.

FIG. 5 illustrates a semiconductor integrated circuit according to a variation of the first embodiment.

A semiconductor integrated circuit 1a illustrated in FIG. 5 is different from the above semiconductor integrated circuit 1 in that the mode switching unit 20 is arranged in the circuit module 10. It is preferable that the mode switching unit 20 in the semiconductor integrated circuit 1a be arranged in the circuit module 10 in such a manner that the output terminals of the mode switching unit 20 are arranged near the bus signal terminal 11 and the test signal terminal 12 of the circuit module 10. In this way, the line length is shortened.

With the semiconductor integrated circuits 1 and 1a according to the first embodiment 1, the mode switching unit 20 fixes the logic level of the test signal line 40 at the L or H level in the system mode and fixes the logic level of the bus signal line 30 at the L or H level in the scan mode. As a result, the crosstalk involving the bus signal line 30 is reduced in the system mode, and the crosstalk involving the test signal line 40 is reduced in the scan mode. With the semiconductor integrated circuits 1 and 1a having this mode switching unit 20, fewer lines are used for crosstalk reduction, and no redundant buffers are inserted. In addition, the line property and the timing QoR are improved. The first embodiment provides high-performance and high-quality semiconductor integrated circuits 1 and 1a that enable reduction of crosstalk in both the system and scan modes while ensuring a better line property and timing QoR.

The bus signal line 30 and the test signal line 40 do not always need to be arranged as straight lines in the semiconductor integrated circuits 1 and 1a. In addition, as long as arranged adjacent to each other, the bus signal line 30 and the test signal line 40 may be arranged in one or more layers in the multi-layer line structure of the semiconductor integrated circuits 1 and 1a.

Next, a second embodiment will be described.

Figure 6:
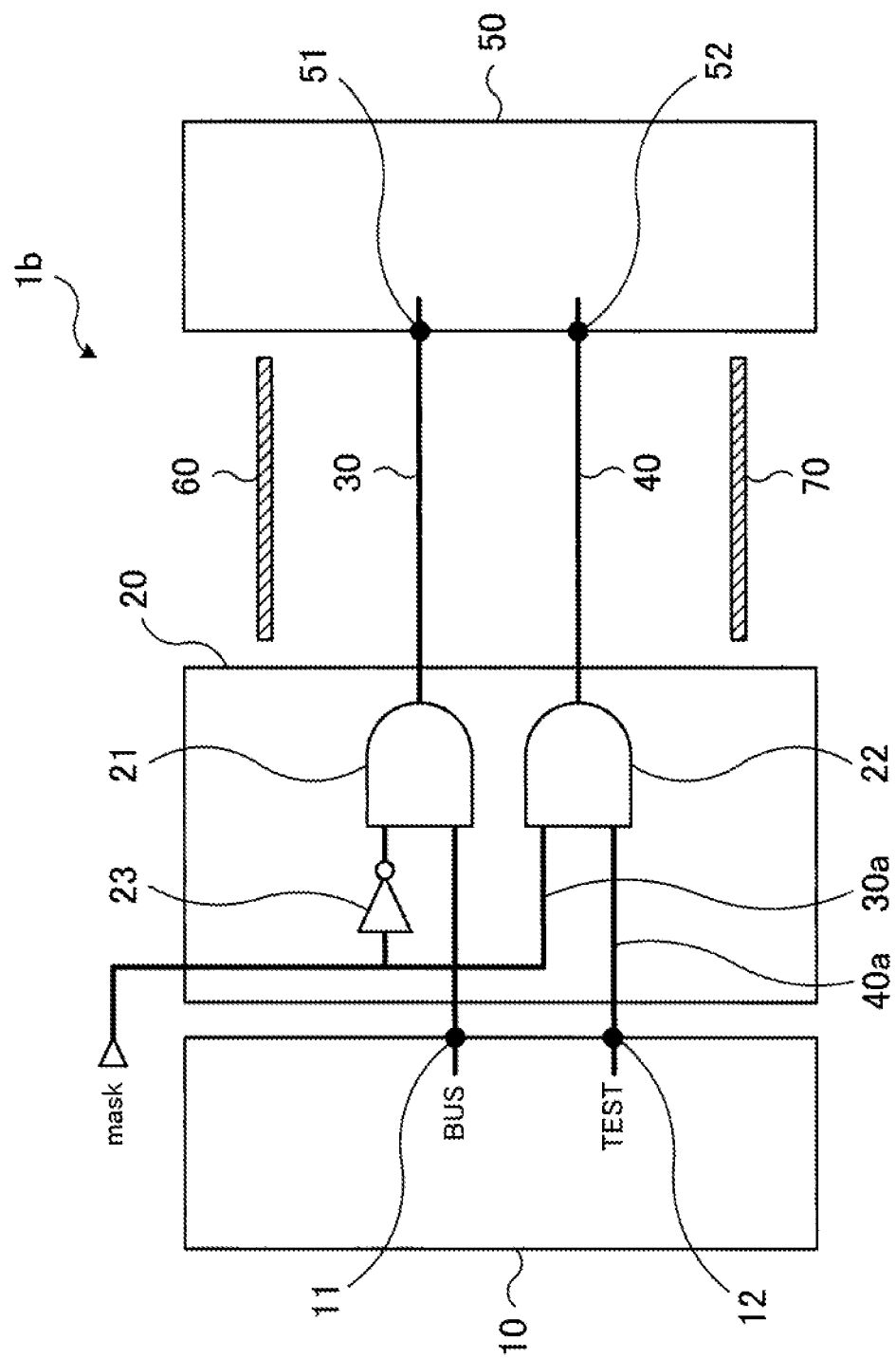
FIG. 6 illustrates an example of a semiconductor integrated circuit according to a second embodiment.

FIG. 6 illustrates an example of a semiconductor integrated circuit according to the second embodiment.

A semiconductor integrated circuit 1b illustrated in FIG. 6 differs from the above semiconductor integrated circuit 1 in that a power supply line 60 is arranged adjacent to a bus signal line 30 on the side opposite a test signal line 40 and a power supply line 70 is arranged adjacent to the test signal line 40 on the side opposite the bus signal line 30.

The power supply line 60 is set to a power supply potential VDD or a ground potential VSS. The power supply line 70 is also set to the power supply potential VDD or the ground potential VSS. Both the power supply line 60 and the power supply line 70 may be set to the power supply potential VDD or the ground potential VSS. Alternatively, one of the lines 60 and 70 may be set to the power supply potential VDD, and the other line may be set to the ground potential VSS. For example, the power supply line 60 and the power supply line 70 are included in a power supply network (a power supply mesh, a power mesh) arranged in the semiconductor integrated circuit 1b. For example, the power supply line 60 and the power supply line 70 may be lines (shield lines) electrically connected to the power supply potential VDD or the ground potential VSS.

When the semiconductor integrated circuit 1b is in the system mode, the bus signal line 30 is sandwiched between the test signal line 40 whose logic level is fixed at the L or H level and the power supply line 60 fixed at the power supply potential VDD or the ground potential VSS. Since the bus signal line 30 is sandwiched between the test signal line 40 and the power supply line 60 having a constant, potential level in the system mode, the crosstalk involving the bus signal line 30 is effectively reduced.

In addition, when the semiconductor integrated circuit 1b is in the scan mode, the test signal line 40 is sandwiched between the bus signal line 30 whose logic level is fixed at the L or H level and the power supply line 70 fixed at the power supply potential VDD or the ground potential VSS. Since the test signal line 40 is sandwiched between the bus signal line 30 and the power supply line 70 having a constant potential level in the scan mode, the crosstalk involving the test signal line 40 is effectively reduced.

By setting the test signal line 40 and the power supply line 60 sandwiching the bus signal line 30 to the same potential level in the system mode, the bus signal line 30 is arranged in an area having a reduced electric field. Thus, in addition to a crosstalk reduction effect, the resistance of the signal transmitted through the bus signal line 30 is reduced. The logic circuit of the mode switching unit 20 may be configured so that the test signal line 40 is set to (is logically fixed at) the same potential level as that of the power supply line 60 in the system mode.

Likewise, by setting the bus signal line 30 and the power supply line 70 sandwiching the test signal line 40 to the same potential level in the scan mode, the test signal line 40 is arranged in an area having a reduced electric field. Thus, in addition to a crosstalk reduction effect, the resistance of the signal transmitted through the test signal line 40 is reduced. The logic circuit of the mode switching unit 20 may be configured so that the bus signal line 30 is set to (is logically fixed at) the same potential level as that of the power supply line 70 in the scan mode.

With the semiconductor integrated circuit 1b according to the second embodiment, fewer lines are used for crosstalk reduction, and no redundant buffers are inserted. In addition, the line property and the timing QoR are improved. The second embodiment provides the high-performance and high-quality semiconductor integrated circuit 1b that enables reduction of crosstalk in both the system and scan modes while ensuring a better line property and timing QoR.

As in the above semiconductor integrated circuit 1a (FIG. 5), the mode switching unit 20 may be included in the circuit module 10 of the semiconductor integrated circuit 1b.

The bus signal line 30 and the test signal line 40 do not always need to be arranged as straight lines in the semiconductor integrated circuit 1b. In addition, as long as arranged adjacent to each other, the bus signal line 30 and the test signal line 40 may be arranged in one or more layers in the multi-layer line structure of the semiconductor integrated circuit 1b.

The configuration of the logic circuit of the mode switching unit 20 is not limited to that as illustrated in FIG. 6.

The mode switching unit 20 may include any logic circuit in which the logic level of one of the bus signal line 30 and the test signal line 40 is fixed at the L or H level and the logic level of the other signal line is not fixed when the mask signal mask is set to the L or H level.

Next, a third embodiment will be described.

Figure 7:
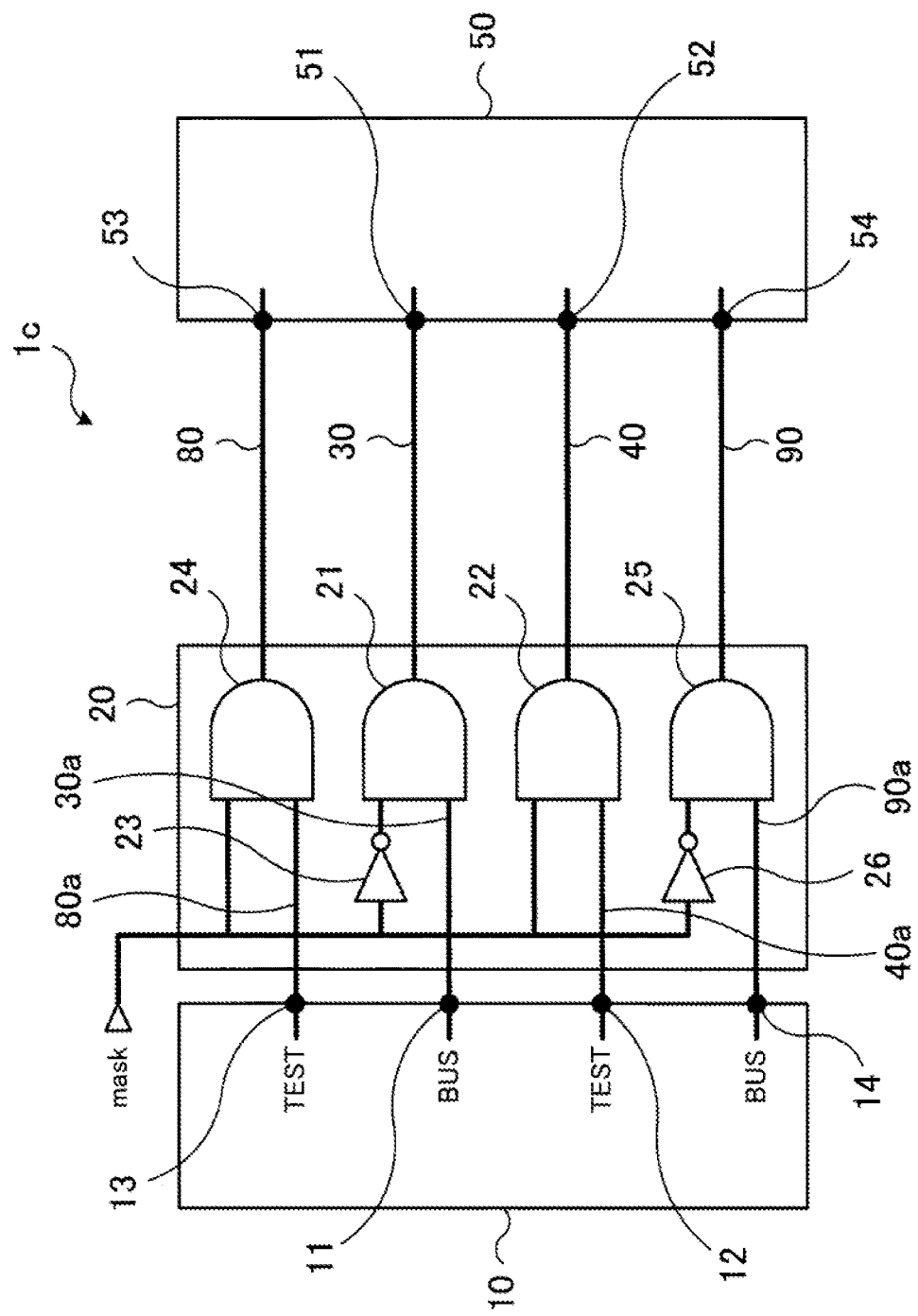
FIG. 7 illustrates an example of a semiconductor integrated circuit according to a third embodiment.

FIG. 7 illustrates an example of a semiconductor integrated circuit according to the third embodiment.

A semiconductor integrated circuit 1c in FIG. 7 includes bus signal lines 30 and 90 and test signal lines 40 and 80. The test signal line 80 is arranged adjacent to the bus signal line 30 on the side opposite the test signal line 40. The bus signal line 90 is arranged adjacent to the test signal line 40 on the side opposite the bus signal line 30.

A circuit module 10 in the semiconductor integrated circuit 1c includes, in addition to a bus signal terminal 11 and a test signal terminal 12, a test signal terminal 13 (an output terminal) connected to the test signal line 80 and a bus signal terminal 14 (an output terminal) connected to the bus signal line 90. The test signal terminal 13 is arranged adjacent to the bus signal terminal 11, and the bus signal terminal 14 is arranged adjacent to the test signal terminal 12.

A circuit module 50 in the semiconductor integrated circuit 1c includes, in addition to a bus signal terminal 51 and a test signal terminal 52, a test signal terminal 53 (an input terminal) connected to the test signal line 80 and a bus signal terminal 54 (an input terminal) connected to the bus signal line 90. The test signal terminal 53 is arranged adjacent to the bus signal terminal 51, and the bus signal terminal 54 is arranged adjacent to the test signal terminal 52.

For example, as illustrated in FIG. 7, a mode switching unit 20 in the semiconductor integrated circuit 1c includes an inverter 26, an AND gate 24, and an AND gate 25, in addition to an inverter 23, an AND gate 21, and an AND gate 22.

The AND gate 24 receives a test signal TEST outputted to a test signal line 80a from the test signal terminal 13 of the circuit module 10 and a mask signal mask. The AND gate 24 outputs the logical product of these signals to the test signal line 80. This output from the AND gate 24 is supplied to the test signal terminal 53 of the circuit module 50 via the test signal line 80.

The AND gate 25 receives a bus signal BUS outputted to a bus signal line 90a from the bus signal terminal 14 of the circuit module 10 and a signal obtained by the inverter 26 inverting the mask signal mask. The AND gate 25 outputs the logical product of these signals to the bus signal line 90. This output from the AND gate 25 is supplied to the bus signal terminal 54 of the circuit module 50 via the bus signal line 90.

With the semiconductor integrated circuit 1c having the above configuration, for example, when the mask signal mask is set to the L level, the semiconductor integrated circuit 1c is set to the system mode, and the outputs from the AND gates 22 and 24, namely, the logic levels of the test signal lines 40 and 80 are fixed at the L level (FIG. 4A). In the system mode, the bus signal line 30 is sandwiched between the test signal lines 40 and 80 at a certain potential level, and the test signal line 40 at the certain potential level is arranged adjacent to the bus signal line 90. Thus, the crosstalk between the bus signal lines 30 and 90 is reduced. Since the bus signal line 30 is sandwiched between the test signal lines 40 and 80 at the same potential level, a crosstalk reduction effect is obtained, and the resistance of the bus signal line 30 is reduced.

In addition, with the semiconductor integrated circuit 1c, for example, when the mask signal mask is set to the H level, the semiconductor integrated circuit 1c is set to the scan mode, and the outputs from the AND gates 21 and 25, namely, the logic levels of the bus signal lines 30 and 90 are fixed at the L level (FIG. 4B). In the scan mode, the test signal line 40 is sandwiched between the bus signal lines 30 and 90 at a certain potential level, and the bus signal line 30 at the certain potential level is arranged adjacent to the test signal line 80. Thus, the crosstalk between the test signal lines 40 and 80 is reduced. Since the test signal line 40 is sandwiched between the bus signal lines 30 and 90 at the same potential level, a crosstalk reduction effect is obtained, and the resistance of the test signal line 40 is reduced.

In the semiconductor integrated circuit 1c according to the third embodiment, the bus signal line 30 is sandwiched between the test signal lines 40 and 80, and the test, signal line 40 is sandwiched between the bus signal lines 30 and 90.

In addition, the logic levels of the test signal lines 40 and 80 are fixed in the system mode, and the logic levels of the bus signal lines 30 and 90 are fixed in the scan mode. With the semiconductor integrated circuit 1c, the crosstalk in the system and scan modes is reduced by the signal line group used for signal transmission between the circuit module 10 and the circuit module 50. With the semiconductor integrated circuit 1c, fewer lines are used for crosstalk reduction, and no redundant buffers are inserted. In addition, the line property and the timing QoR are improved. The third embodiment provides the high-performance and high-quality semiconductor integrated circuit 1c that enables reduction of crosstalk in both the system and scan modes while ensuring a better line property and timing QoR.

As in the above semiconductor integrated circuit 1a (FIG. 5), the mode switching unit 20 may be included in the circuit module 10 of the semiconductor integrated circuit 1c.

The bus signal lines 30 and 90 and the test signal lines 40 and 80 in the semiconductor integrated circuit 1c do not always need to be arranged as straight lines. In addition, as long as arranged adjacent to each other, these lines may be arranged in one or more layers in the multi-layer line structure of the semiconductor integrated circuit 1c.

In addition, the configuration of the logic circuit of the mode switching unit 20 is not limited to that as illustrated in FIG. 7. The mode switching unit 20 may include any logic circuit in which the logic level of one of the pair of bus signal lines 30 and 90 and the pair of test signal lines 40 and 80 is fixed at the L or H level and the logic level of the other pair is not fixed when the mask signal mask is set to the L or H level.

Next, a fourth embodiment will be described.

Hereinafter, an example of a semiconductor integrated circuit design method will be described as a fourth embodiment. Various kinds of processing performed in designing a semiconductor integrated circuit may be performed by using a computer as will be described with reference to FIG. 27.

Figure 8:
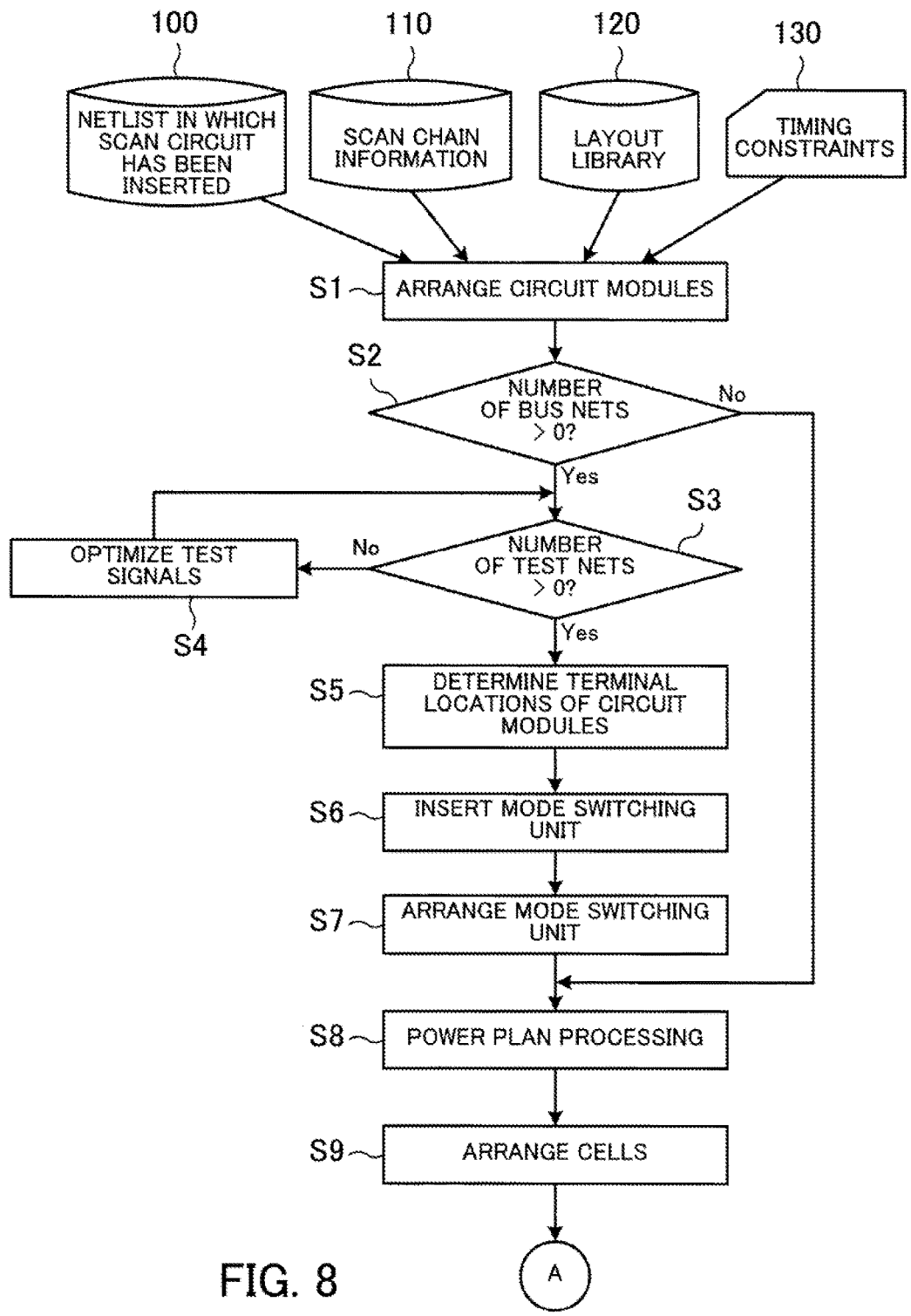
FIGS. 8 and 9 illustrate an example of a semiconductor integrated circuit design method according to a fourth embodiment.
Figure 9:
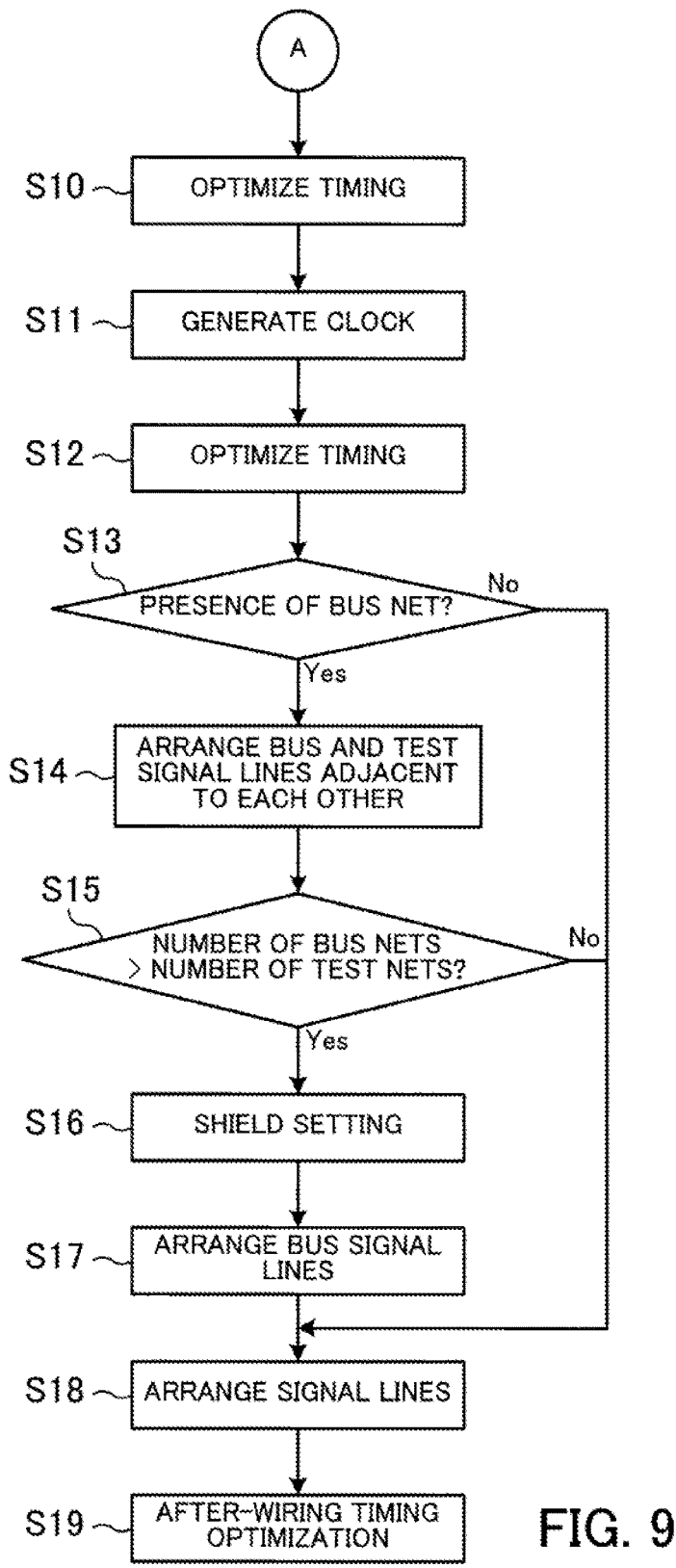

FIGS. 8 and 9 illustrate an example of a semiconductor integrated circuit design method according to the fourth embodiment.

When a semiconductor integrated circuit is designed, first, a group of circuit modules is arranged by using information such as a net list 100 in which a scan circuit has been inserted, scan chain information 110, a layout library 120, and timing constraints 130 (step S1; FIG. 8). For example, an HLB is arranged as the circuit modules.

The net list 100 includes a net list in which information about a scan circuit including a group of FFs in the semiconductor integrated circuit is inserted. The scan chain information 110 includes information about connection of the FF group of the scan circuit. FIG. 10 illustrates an example of the scan chain information 110. The layout library 120 includes information about the size, the area, the structure of a group of cells such as standard cells or macrocells (the internal layouts of cells, locations of terminals, etc.). The timing constraints 130 include information about constraints on various kinds of timing in the system and scan modes.

After arranging the circuit module group, bus signal terminals (bus nets) are extracted per circuit module, to determine whether there are any bus nets (step S2; FIG. 8). If a circuit module includes a bus net, test terminals (test nets) are extracted, to determine whether there are any test nets (step S3; FIG. 8).

Figure 11:
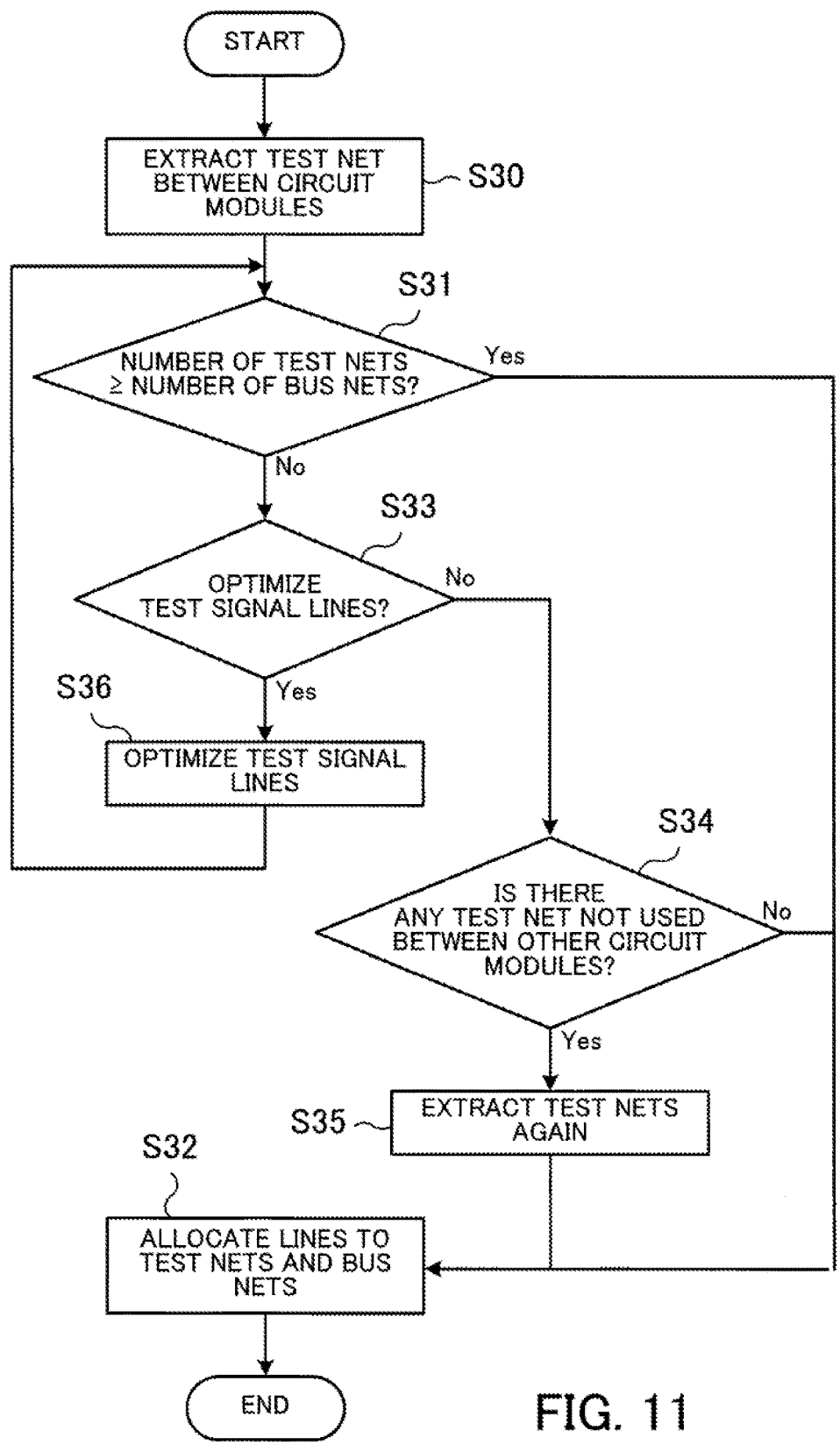
FIG. 11 illustrates an example of test net extraction processing.

FIG. 11 illustrates an example of test net extraction processing.

In the test net extraction processing, first, a test net between circuit modules is extracted (step S30; FIG. 11). Next, the number of test nets extracted is compared with the number of bus nets extracted previously (step S31; FIG. 11).

If the number of test nets is equal to or more than the number of bus nets, lines are allocated to the test nets and the bus nets (step S32; FIG. 11).

If the number of test nets falls below the number of bus nets and if the test signal lines are not. optimized (step S33; FIG. 11), whether there is any test net not used between other circuit modules is determined (step S34; FIG. 11). If there is such a test net, extraction of the test nets is performed again (step S35; FIG. 11). Next, lines are allocated to the test nets and the bus nets (step S32; FIG. 11). If there is no such a test net, lines are allocated to the test nets and the bus nets without performing the extraction of the test nets again (step S32; FIG. 11).

If the number of test nets falls below the number of bus nets and if the test signal lines are optimized (step S33; FIG. 11), the test signal lines are optimized (step S36; FIG. 11), and the processing returns to step S31.

The optimization of the test signal lines includes processing for reconnecting the scan chain. For example, even when the order of connection of the scan chain has previously been determined before the circuit modules are arranged, the arrangement of FFs could be disordered and lines could cross over one another or could be extended after the circuit modules are arranged. Unless these disordered FFs and lines are properly adjusted, lines are connected or the line area is expanded. By reconnecting the scan chain, the congestion of lines and the expansion of the line area are prevented.

Referring back to FIG. 8, if no test net has been extracted in step S3, the test signal lines are optimized (step S4; FIG. 8). After the test signal lines are optimized, the test net extraction processing in step S3 (steps S30 to S36) is performed again.

After the test net extraction processing, terminal locations of an individual circuit module group are determined (step S5; FIG. 8).

Figure 12:
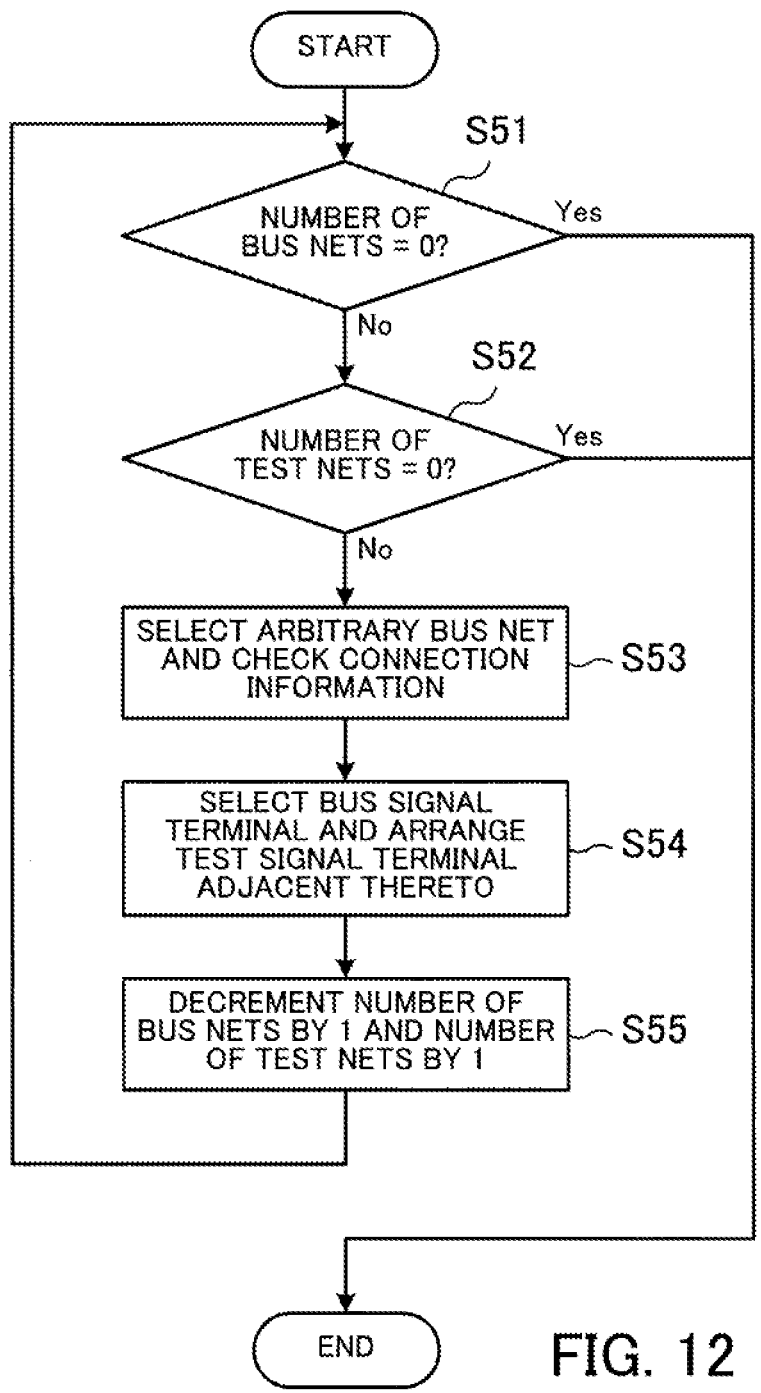
FIG. 12 illustrates an example of terminal location determination processing.

FIG. 12 illustrates an example of the terminal location determination processing.

In the terminal location determination processing, first, whether the number of bus nets is 0 is determined per circuit module (step S51; FIG. 12). Next, whether the number of test nets is 0 is determined (step S52; FIG. 12). Step S52 may be performed before step S51.

Per circuit module, unless both the number of bus nets and the number of test nets are 0, an arbitrary bus net is selected, and the connection information is checked (step S53; FIG. 12). Next, a test signal terminal is arranged adjacent to a selected bus signal terminal (step S54; FIG. 12). Next, the number of bus nets is decremented by 1, and the number of test nets is decremented by 1 (step S55; FIG. 12). Next, the processing returns to step S51.

Tis terminal location determination processing is performed on an individual circuit module until either the number of bus nets or the number of test nets reaches 0. In this way, a combination of a bus signal terminal and a test signal terminal adjacent to each other is generated and arranged.

Referring back to FIG. 8, after the terminal location determination processing in step S5, the mode switching unit insertion processing is performed (step S6; FIG. 8). Next, the mode switching unit arrangement processing is performed (step S7; FIG. 8).

Figure 13:
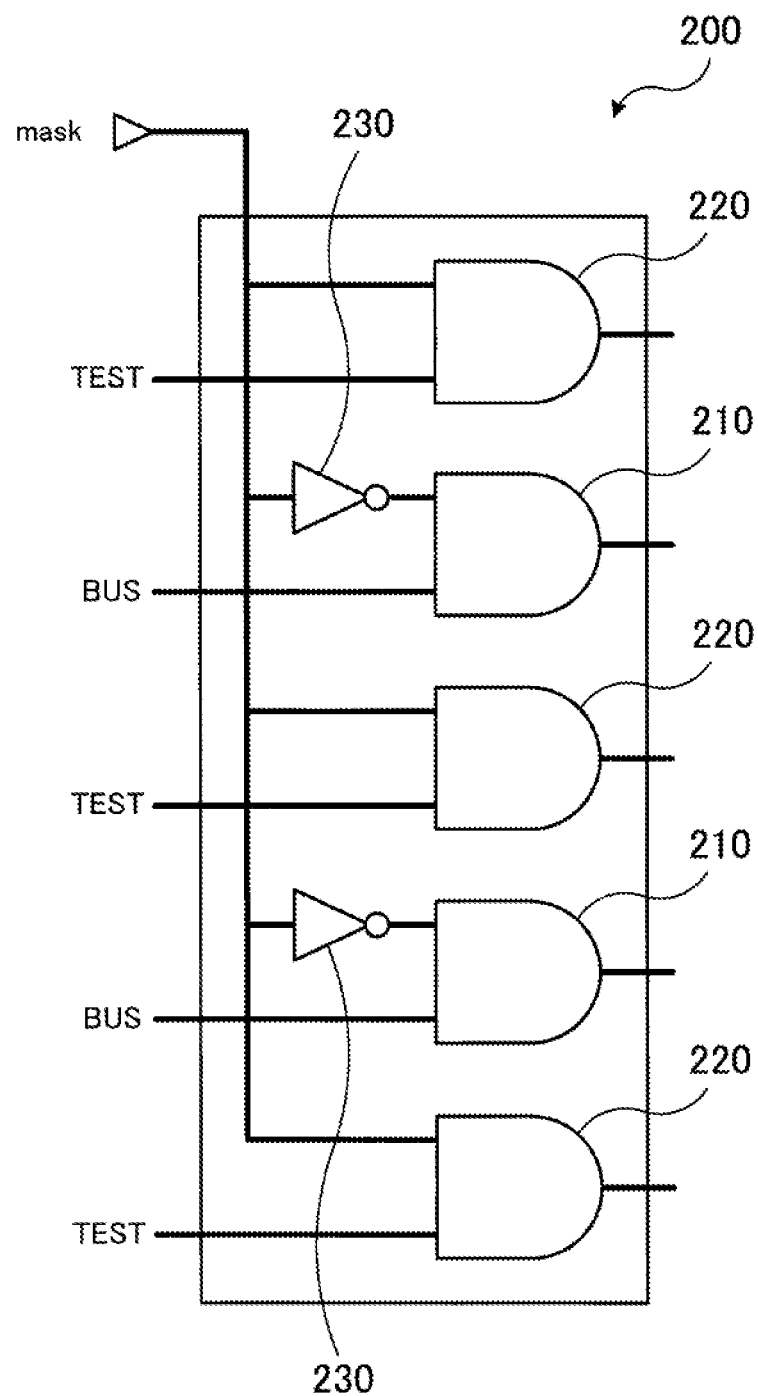
FIG. 13 illustrates an example of a mode switching unit.
Figure 14A:
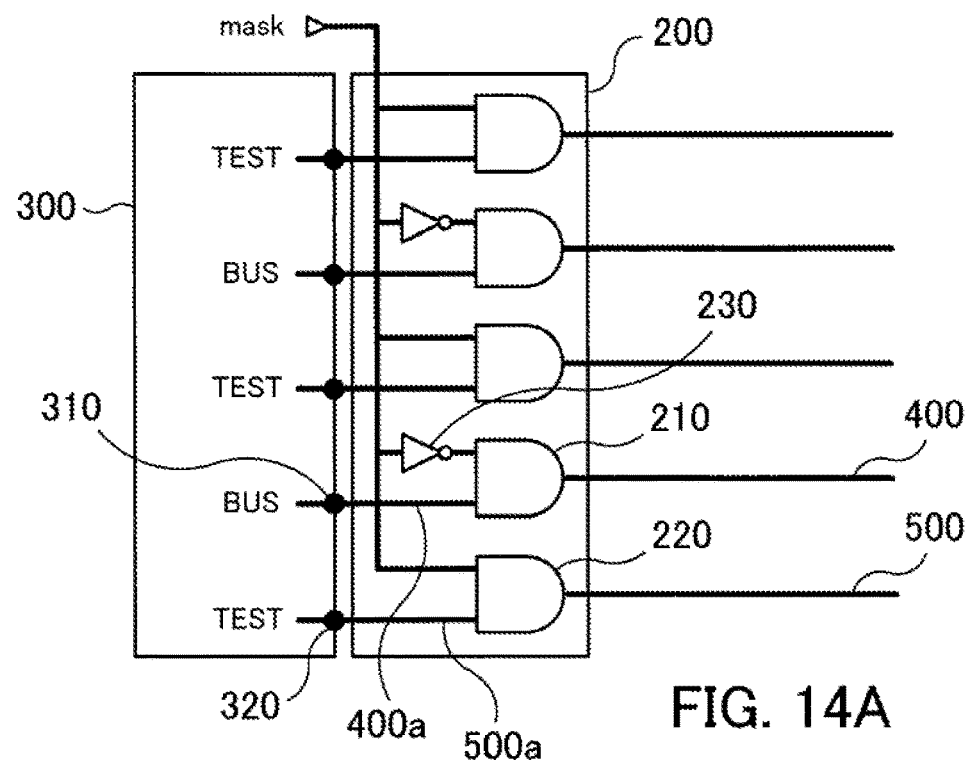
FIGS. 14A and 14B illustrate examples of arrangement of the mode switching unit.
Figure 14B:
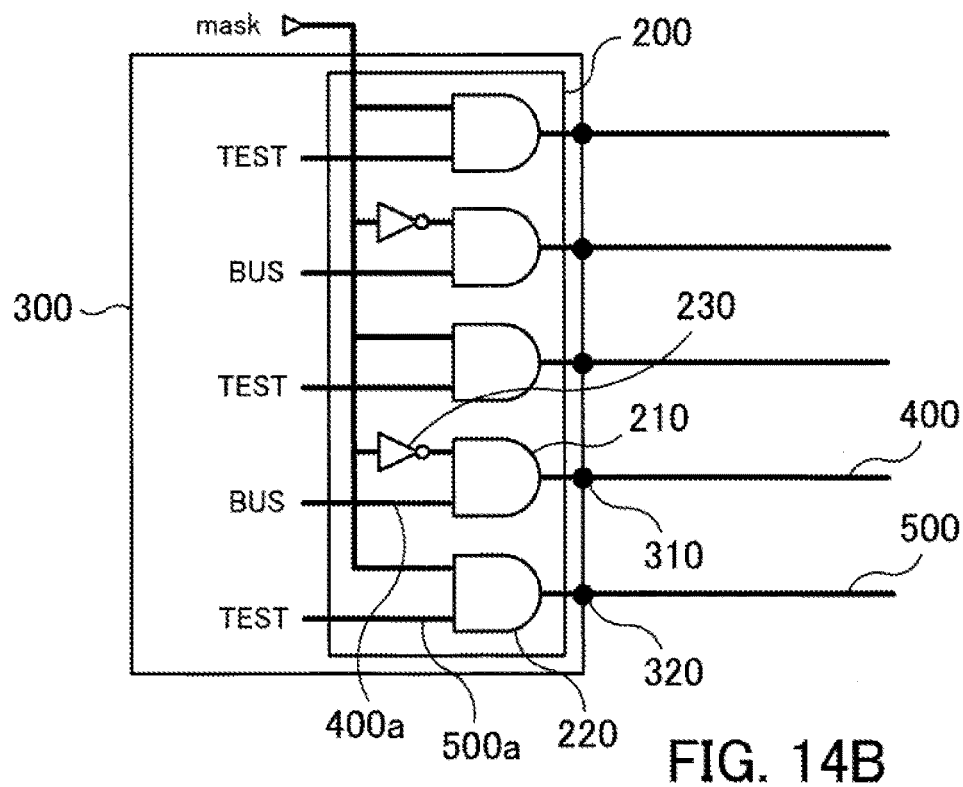

FIG. 13 illustrates an example of a mode switching unit, and FIGS. 14A and 14B illustrate examples of arrangement of the mode switching unit.

For example, a mode switching unit 200 as illustrated in FIG. 13 is inserted. The mode switching unit 200 illustrated as an example in FIG. 13 includes inverters 230, AND gates 210, and AND gates 220. An individual AND gate 210 receives a signal, obtained by a corresponding inverter 230 inverting the mask signal mask, via one of its two input terminals. The AND gate 210 also receives a bus signal BUS via the other input terminal. An individual AND gate 220 receives the mask signal mask via one of its two input terminals and a test signal TEST via the other input terminal. An individual AND gate 210 has an output terminal connected to a bus signal line, and an individual AND gate 220 has an output terminal connected to a test signal line. With this mode switching unit 200, when the mask signal mask is at the L level, the logic level of the test signal line is fixed at the L level. When the mask signal mask is at the H level, the logic level of the bus signal line is fixed at the L level.

The AND gates 210 connected to the respective inverters 230 and the AND gates 220 as illustrated in FIG. 13 are arranged to correspond to the adjacently-arranged bus and test signal terminals of a circuit module that outputs signals. Information about this mode switching unit 200 and information for inserting this mode switching unit 200 are generated.

For example, as illustrated in FIG. 14A, the mode switching unit 200 is arranged near bus signal terminals 310 and test signal terminals 320, all of which are output terminals, of a circuit module 300 that outputs signals. An individual bus signal terminal 310 is connected to one of the two input terminals of a corresponding AND gate 210 via a bus signal line 400a, and the output terminal of the AND gate 210 is connected to a bus signal line 400, An individual test, signal terminal 320 is connected to one of the two input, terminals of a corresponding AND gate 220 via a test signal line 500a, and the output terminal of the AND gate 220 is connected to a test signal line 500. Since the mode switching unit 200 is arranged near the bus signal terminals 310 and the test signal terminals 320 of the circuit module 300 as illustrated in FIG. 14A, the lengths of the bus signal lines 400a and the test, signal lines 500a are shortened. In addition, the area occupied by the mode switching unit. 200 and the circuit module 300 is reduced, and other lines are arranged more freely.

In addition, for example, as illustrated in FIG. 14B, the mode switching unit 200 may be arranged in the circuit module 300 that outputs signals. In this case, the output, terminals of the mode switching unit 200 (the output terminals of the AND gates 210 and 220) are arranged near the bus signal terminals 310 and the test, signal terminals 320 of the circuit module 300. The bus signal terminals 310 of the circuit module 300 are connected to the respective bus signal lines 400, and the test, signal terminals 320 of the circuit module 300 are connected to the respective test signal lines 500. Since the output terminals of the mode switching unit 200 are arranged near the bus signal terminals 310 and the test signal terminals 320 of the circuit module 300 as illustrated in FIG. 14B, the line lengths among these terminals are shortened. In addition, the area occupied by the circuit module 300 including the mode switching unit 200 is reduced, and other lines are arranged more freely.

The mode switching unit 200 arranged fixes the logic level of the test signal line 500 at the L level when the mask signal mask is at the L level and fixes the logic level of the bus signal line 400 at the L level when the mask signal mask is at the H level.

The configuration of the mode switching unit 200 is not limited to any of the configurations illustrated in FIGS. 13, 14A, and 14B. The mode switching unit 200 may include any logic circuit in which the logic level of one of a bus signal line 400 and a test signal line 500 is fixed at the L or H level and the logic level of the other line is not fixed when the mask signal mask is set to the L or H level.

Referring back to FIG. 8, after the mode switching unit is inserted and arranged in steps S6 and S7, power plan processing is performed (step S8; FIG. 8). In the power plan processing, power supply lines (VDD lines and VSS lines) are arranged.

Figure 15:
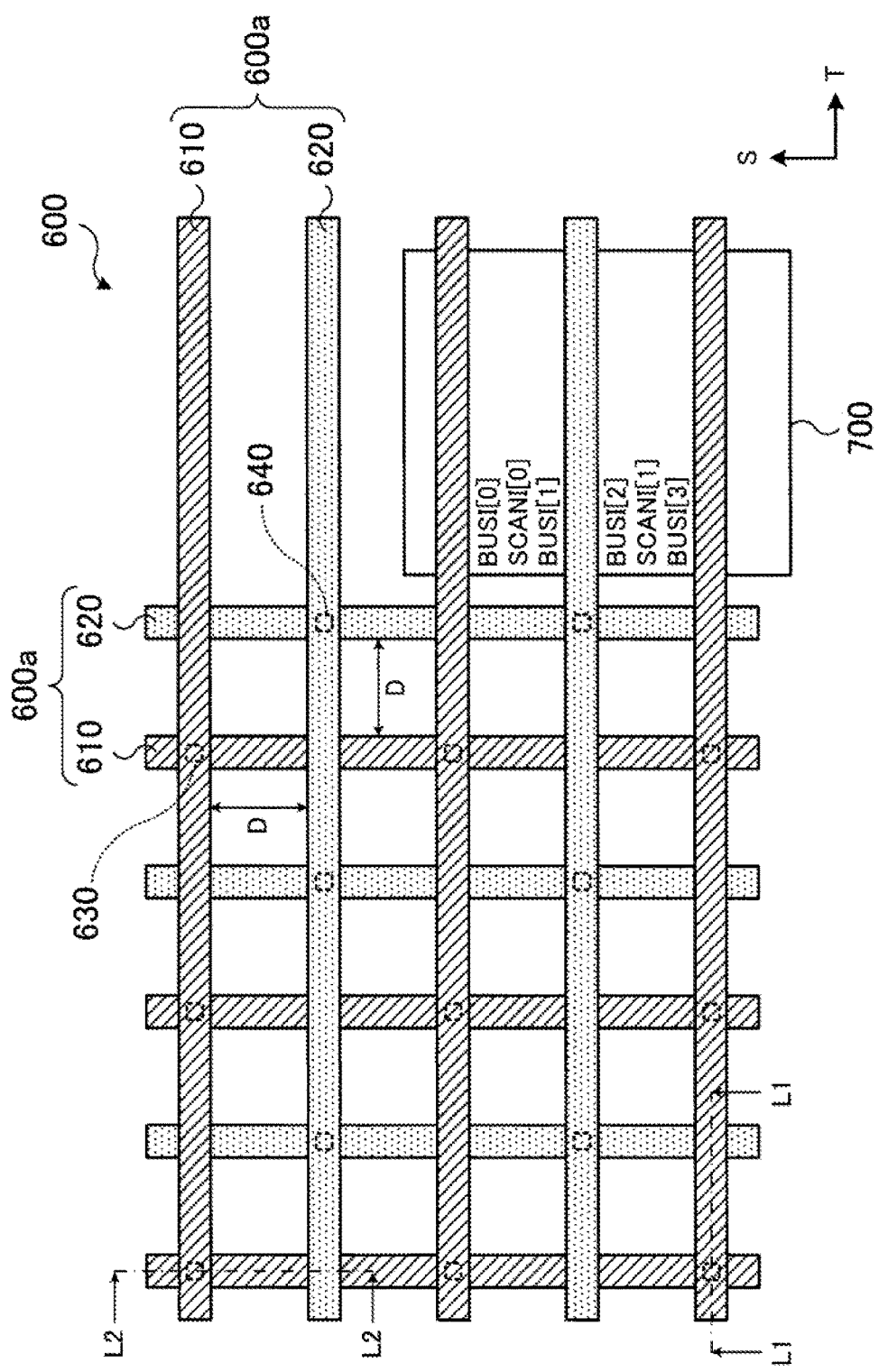
FIGS. 15, 16A, and 16B illustrate examples of arrangement of power supply lines.
Figure 16A:
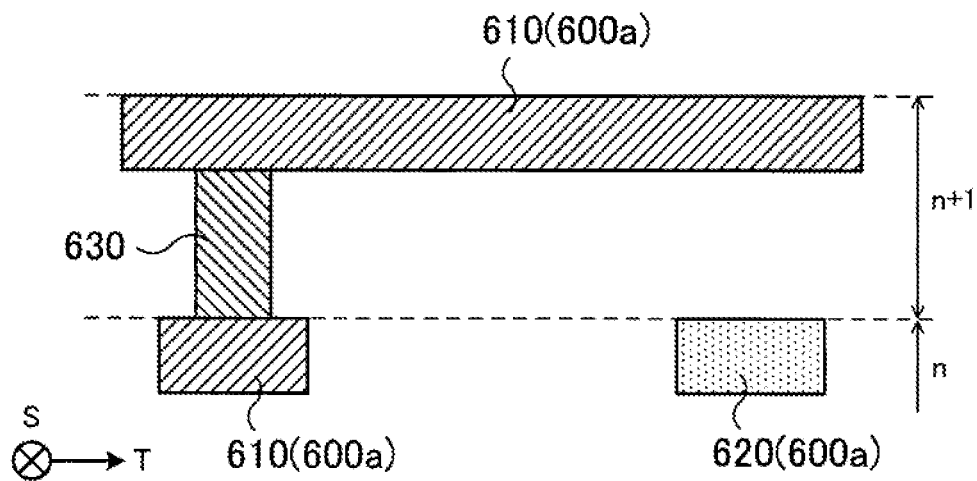
Figure 16B:
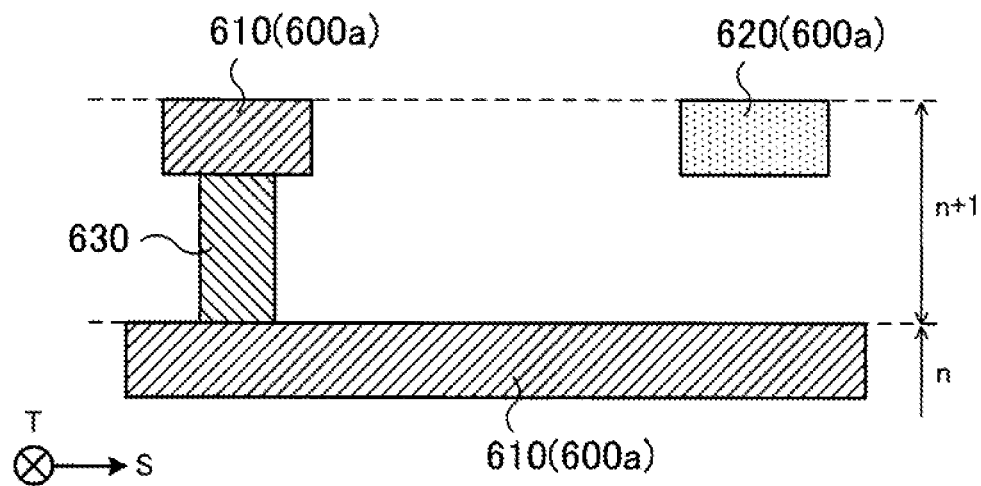

FIGS. 15, 16A, and 16B illustrate examples of arrangement of power supply lines. FIG. 15 is a plan view of main portions of power supply lines. FIGS. 16A and 16B are sectional views of main portions of power supply lines. FIG. 16A is a sectional view taken along line L1-L1 in FIG. 15, and FIG. 16B is a sectional view taken along line L2-L2 in FIG. 15.

For example, a power supply network (a power mesh) 600 including a group of power supply lines 600a extending in directions S and T is arranged as illustrated in FIGS. 15, 16A, and 16B. The power mesh 600 includes VDD lines 610 supplied with a power supply potential and VSS lines 620 supplied with a ground potential. By using the power mesh 600, a circuit modules 700, etc. in the semiconductor integrated circuit are supplied with the power supply. The circuit module 700 illustrated as an example in FIG. 15 includes input-side bus signal terminals BUSI[0] to [3] and test signal terminals SCANI[0] to [1] arranged adjacent to each other.

For example, the VDD lines 610 and the VSS lines 620 extending in the direction S are arranged in the n-th line layer of the multi-layer line structure of the semiconductor integrated circuit, and the VDD lines 610 and the VSS lines 620 extending in the direction T are arranged in the (n+1)th line layer of the multi-layer line structure. The n-th and (n+1)th VDD lines 610 are connected to each other via contact portions 630, and the n-th and (n+1)th VSS lines 620 are connected to each other via contact portions 640. In many cases, the power mesh 600 is arranged in the fourth or higher layer of the multi-layer line structure (n≥4).

The VDD lines 610 and the VSS lines 620 extending in the direction S are alternately arranged side by side, and the VDD lines 610 and the VSS lines 620 extending in the direction T are also alternately arranged side by side. In either direction S or T, an individual VDD line 610 and an individual VSS line 620 are spaced apart from each other with a distance D, which is wide enough to accommodate at least two lines between the lines 610 and 620.

After the power plan processing in step S8, in accordance with a conventional method, the cells of an individual circuit module are arranged (step S9; FIG. 8), and timing optimization on the basis of the timing constraints 130 is performed (step S10; FIG. 9). In addition, in accordance with a conventional method, clock generation for arranging a clock signal line is performed (step S11; FIG. 9), and timing optimization on the basis of the timing constraints 130 is performed (step S12; FIG. 9).

Thereafter, whether an individual circuit module includes a bus net is determined (step S13; FIG. 9). For a circuit module including a bus net, an individual bus signal line and an individual test signal line are arranged adjacent to each other in the power mesh (step S14; FIG. 9).

Figure 17:
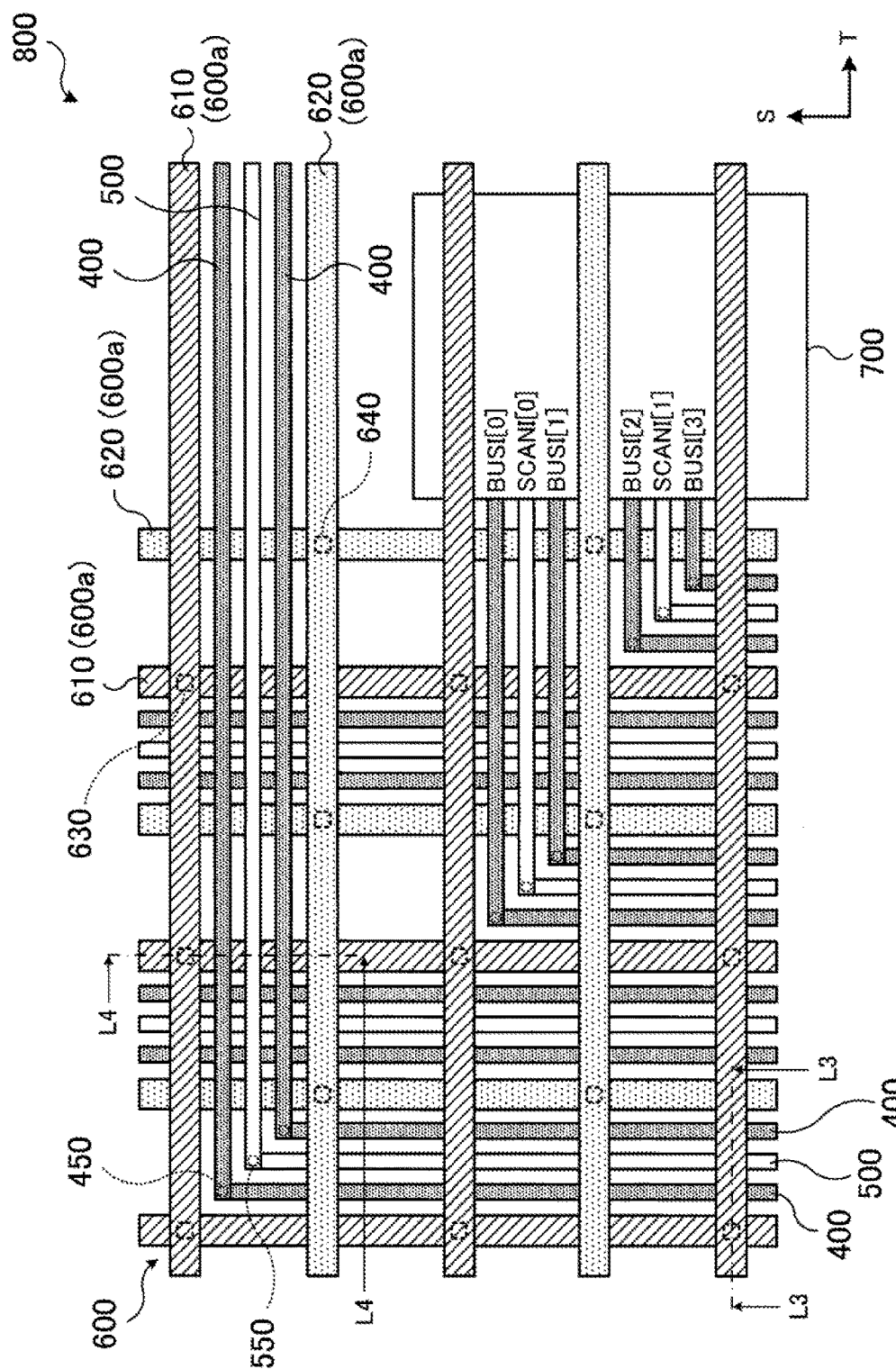
FIGS. 17, 18A, and 18B illustrate examples of adjacent, arrangement of bus signal lines and test, signal lines.
Figure 18A:
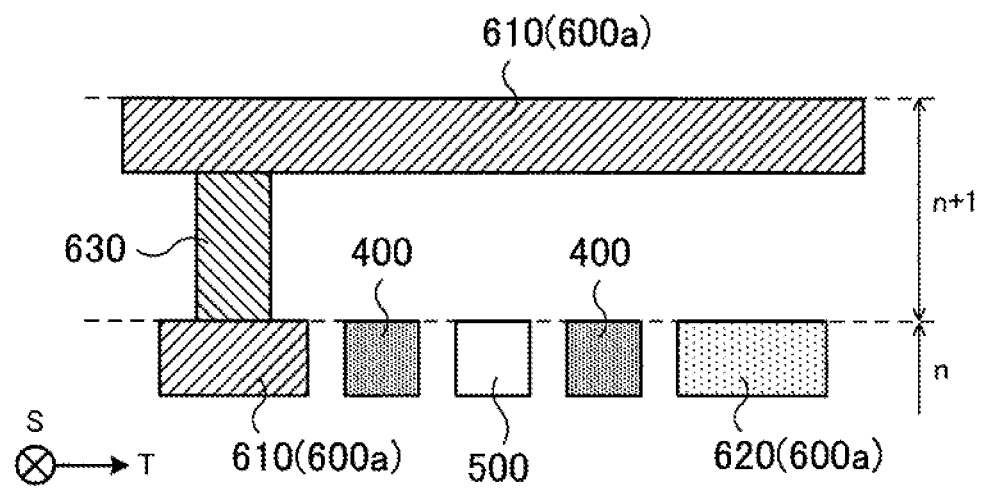
Figure 18B:
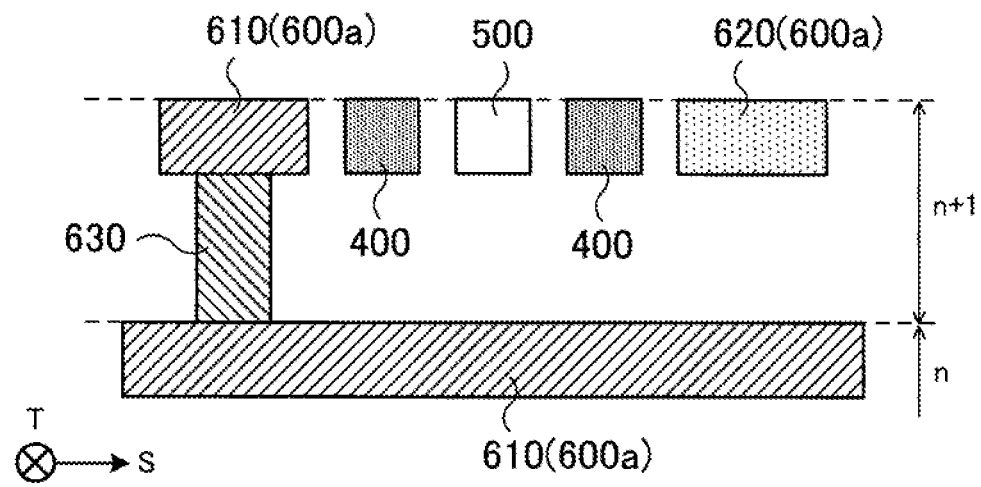

FIGS. 17, 18A, and 18B illustrate an example of how an individual bus signal line and a test signal line are arranged adjacent to each other. FIG. 17 is a plan view of main portions of the power mesh, the bus signal lines, and the test signal lines. FIGS. 18A and 18B are sectional views of main portions of the power mesh, the bus signal lines, and the test signal lines. FIG. 18A is a sectional view taken along line L3-L3 in FIG. 17, and FIG. 18B is a sectional view taken along line L4-L4 in FIG. 17.

For example, two bus signal lines 400 and one test, signal line 500 are arranged to extend side by side between a VBD line 610 and a VSS line 620 arranged adjacent, to each other with the predetermined distance D in the power mesh 600, as illustrated in FIGS. 17, 18A, and 18B.

Namely, between a VDD line 610 and a VSS line 620 in the n-th layer arranged side by side in the direction S, two bus signal lines 400 and one test signal line 500 are arranged side by side in parallel to the VDD line 610 and the VSS line 620. Likewise, between a VDD line 610 and a VSS line 620 in the (n+1)th layer arranged side by side in the direction T, two bus signal lines 400 and one test signal line 500 are arranged side by side in parallel to the VDD line 610 and the VSS line 620. The bus signal lines 400 in the n-th and (n+1)th layers are connected to each other via contact portions 450, and the test signal lines 500 in the n-th and (n+1)th layers are connected to each other via contact portions 550. An individual set of two bus signal lines 400 and one test signal line 500 arranged between a VDD line 610 and a VSS line 620 in each layer is arranged in such a manner that the bus signal lines 400 and the test signal line 500 are adjacent to each other.

The two bus signal lines 400 and one test signal line 500 arranged adjacent to each other are connected to corresponding bus signal terminals and test signal terminal arranged adjacent to each other in a corresponding circuit module (step S5; FIG. 8, FIG. 12). For example, as illustrated in FIG. 17, two bus signal lines 400 and one test signal line 500 are connected to bus signal terminals BUSI and a test signal terminal SCANI, respectively, adjacent to each other in the circuit module 700.

Alternatively, two bus signal lines 400 and one test signal line 500 arranged adjacent, to each other are connected to bus signal terminals and a test signal terminal, respectively, arranged adjacent to each other in a predetermined circuit module in which a mode switching unit is inserted and arranged (steps S5 to S7; FIG. 8, FIGS. 12 to 14B). For example, as illustrated in FIG. 14A, the bus signal lines 400 and the test signal lines 500 are connected to the output terminals of the mode switching unit 200 (the output terminals of the AND gates 210 and 220), the AND gates 210 and 220 being connected to the adjacently-arranged bus signal terminals 310 and test signal terminals 320 of the circuit module 300. For example, as illustrated in FIG. 14B, the bus signal lines 400 and the test signal lines 500 are connected to the bus signal terminals 310 and the test signal terminals 320 of the circuit module 300 connected to the adjacently-arranged output terminals of the mode switching unit 200 (the output terminals of the AND gates 210 and 220).

Referring back to FIG. 9, after an individual bus signal line and an individual test signal line are arranged adjacent to each other, the number of bus nets and the number of test nets are compared with each other per circuit module (step S15; FIG. 9). For a circuit module having more bus nets than test nets, namely, for a circuit module having a bus signal terminal that is not adjacent to a test signal terminal, shield setting such as arrangement of a shield line is performed in accordance with a conventional method (step S16; FIG. 9). The bus signal lines are arranged for the remaining bus signal terminals in accordance with a conventional method (step S17; FIG. 9). In addition, the remaining signal lines needed to be arranged in the semiconductor integrated circuit are arranged in accordance with a conventional method (step S18; FIG. 9), and after-wiring timing optimization is performed (step S19; FIG. 9).

In step S15, if the number of bus nets of a circuit module is equal to or less than the number of test nets of the circuit module, the processing proceeds to step S18.

If a circuit module does not have a bus net in step S2, the processing proceeds to step SB (FIG. 8). In this case, it is determined that this circuit module does not have a bus net in step S13, and the processing proceeds to step S18 (FIG. 9).

In accordance with the above method, a semiconductor integrated circuit 800 including the power mesh 600 and a plurality of sets of bus signal lines 400 and a test signal line 500 adjacent to each other arranged in the power mesh 600 is obtained. The semiconductor integrated circuit 800 obtained in this way enables effective reduction of the crosstalk between bus signal lines 400 in the system mode and the crosstalk between test signal lines 500 in the scan mode while using fewer line resources.

Figure 19:
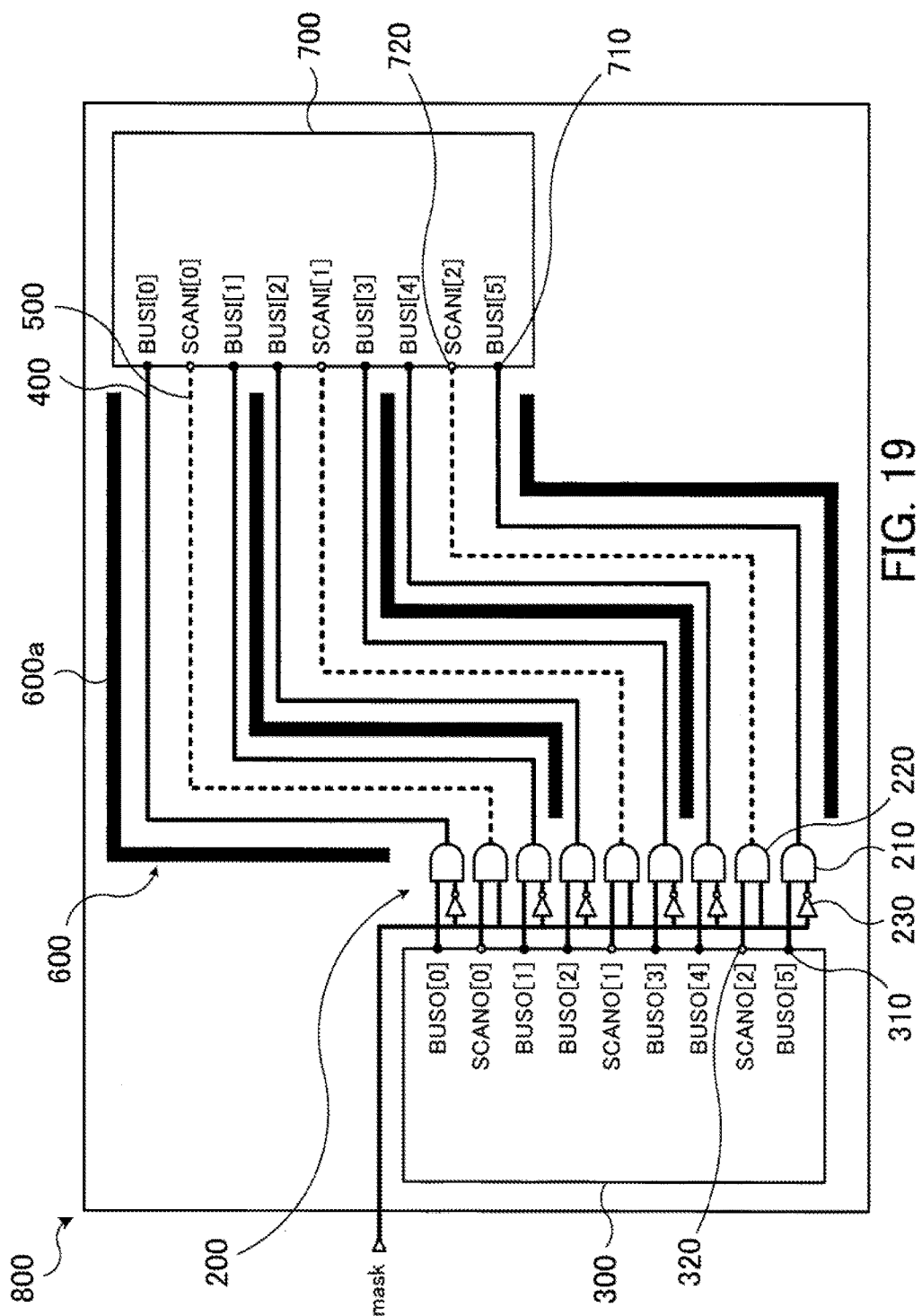
FIG. 19 illustrates an example of a semiconductor integrated circuit according to the fourth embodiment.

FIG. 19 illustrates an example of a semiconductor integrated circuit according to the fourth embodiment. FIG. 19 is a plan view of main portions of an example of a semiconductor integrated circuit according to the fourth embodiment.

In accordance with the above method, for example, a semiconductor integrated circuit 800 having a plan view as illustrated in FIG. 19 is obtained. The semiconductor integrated circuit 800 includes a power mesh (500, an output-side circuit module 300, a mode switching unit 200 arranged near: and connected to the circuit module 300, and an input-side circuit module 700 connected to the mode switching unit 200 via bus signal lines 400 and test signal lines 500. For convenience, the bus signal lines 400 are represented by solid lines, and the test signal lines 500 are represented by dotted lines.

The output from an individual one of BUSO[0] to [5], which are bus signal terminals 310 of the circuit module 300, is supplied to one of the input terminals of a corresponding AND gate 210 of the mode switching unit 200. The other input terminal of each of the AND gates 210 is supplied with a signal obtained by a corresponding inverter 230 inverting a mask signal mask. The output from each of the AND gates 210 is connected to a bus signal line 400.

The output from an individual one of SCANO[0] to [2], which are test signal terminals 320 of the circuit module 300, is supplied to one of the input terminals of a corresponding AND gate 220 of the mode switching unit 200. The other input terminal of each of the AND gates 220 is supplied with the mask signal mask. The output from each of the AND gates 220 is connected to a test signal line 500.

An individual bus signal terminals 310 and an individual test signal terminals 320 of the circuit module 300 are arranged adjacent to each other. The mode switching unit 200 including the inverters 230 and the AND gates 210 and 220 is inserted and arranged to correspond to the arrangement of the bus signal terminals 310 and the test signal terminals 320 of the circuit module 300.

The group of bus signal lines 400 and the group of test signal lines 500 are arranged among a group of power supply lines 600a of the power mesh 600 in such a manner that an individual bus signal line 400 and an individual test signal line 500 are adjacent to each other. The group of bus signal lines 400 are connected to BUSI[0] to [5], which are bus signal terminals 710 of the circuit module 700, and the group of test signal lines 500 are connected to SCANI[0] to [2], which are test signal terminals 720 of the circuit module 700.

The terminals BUSO[0] to [5] of the circuit module 300 are connected to the terminals BUSI[0] to [5] of the circuit module 700 via the mode switching unit 200 and the group of bus signal lines 400, respectively. The terminals SCANO [0] to [2] of the circuit, module 300 are connected to the terminals SCANI[0] to [2] of the circuit module 700 via the mode switching unit 200 and the group of test signal lines 500, respectively.

In a semiconductor integrated circuit 800, an individual power supply line 600a, bus signal line 400, and test signal line 500 are alternately arranged. When the mask signal mask is set to the L level, the semiconductor integrated circuit 800 is set to the system mode, and the logic levels of the test signal lines 500 are fixed at the L level. In this state, since an individual bus signal line 400 is sandwiched between a test signal line 500 whose logic level is fixed and a power supply line 600a, the crosstalk between bus signal lines 400 is effectively reduced. In addition, when the mask signal mask is set to the H level, the semiconductor integrated circuit 800 is set to the scan mode, and the logic levels of the bus signal lines 400 are fixed at the L level. In this state, since an individual test signal line 500 is sandwiched between a bus signal line 400 whose logic level is fixed and a power supply line 600a, the crosstalk between test signal lines 500 is effectively reduced.

In this way, the semiconductor integrated circuit 800 enables reduction of the crosstalk in both the system mode and the scan mode.

In addition, this semiconductor integrated circuit 800 achieves a better line property while using fewer line resources.

Figure 20:
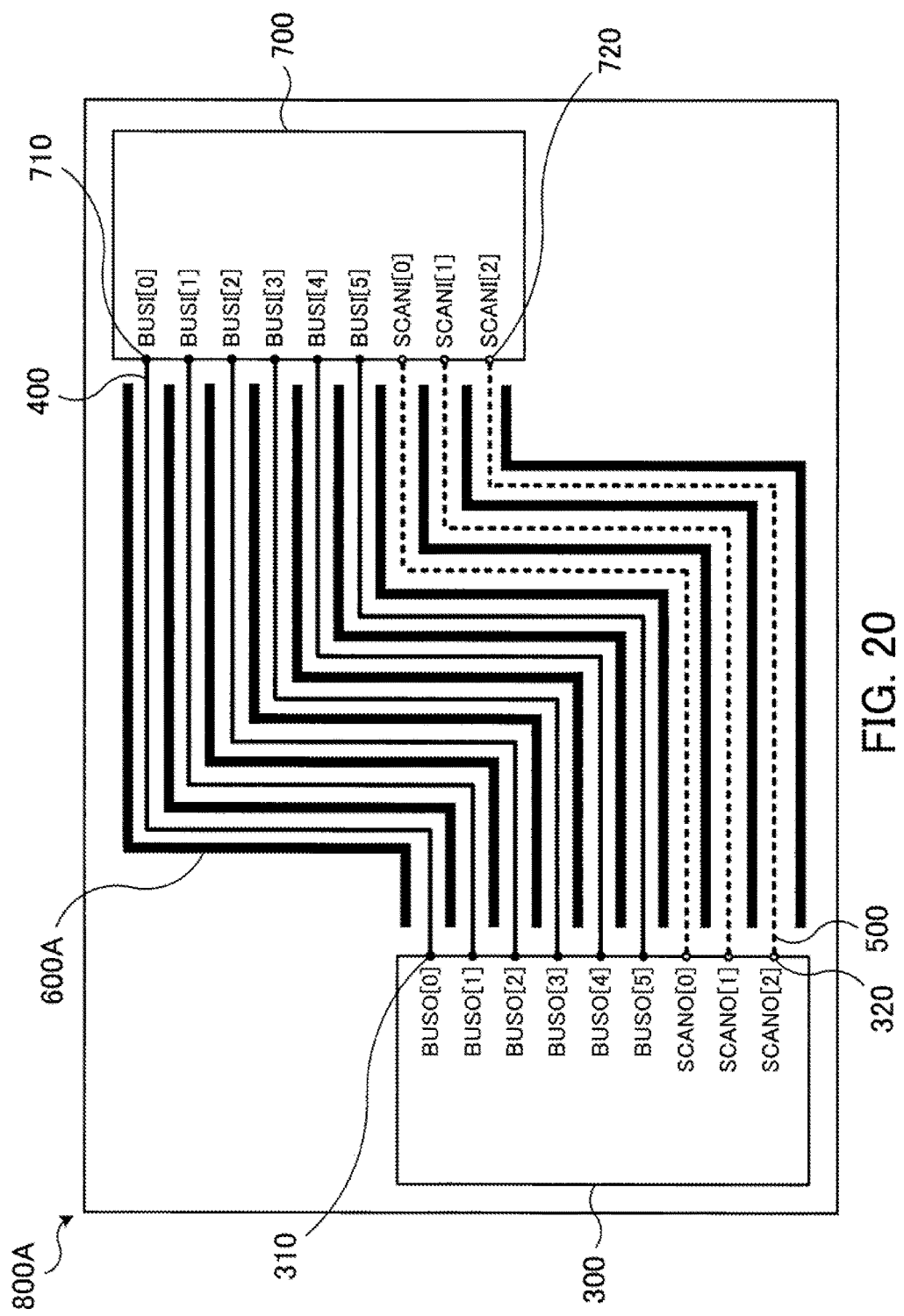
FIG. 20 illustrates a semiconductor integrated circuit according to a first comparative example.

Next, FIG. 20 illustrates a semiconductor integrated circuit according to a first comparative example. FIG. 20 is a plan view of main portions of a semiconductor integrated circuit.

A semiconductor integrated circuit 800A illustrated in FIG. 20 is an example in which the crosstalk is reduced without using the method according to the fourth embodiment.

In this semiconductor integrated circuit 800A, BUSO[0] to [5], which are bus signal terminals 310 of a circuit module 300, and SCANO[0] to [2], which are test signal terminals 320 of the circuit module 300, are arranged sequentially. In addition, BUSI[0] to [5], which are bus signal terminals 710 of a circuit module 700, and SCANI[0] to [2], which are test signal terminals 720 of the circuit module 700, are sequentially arranged to correspond to the terminals BUSO[0] to [5] and the terminals SCANO[0] to [2]. The terminals BUSO[0] to [5] of the circuit module 300 and the terminals BUSI[0] to [5] of the circuit module 700 are connected to each other via bus [2] signal lines 400, respectively. The terminals SCANO[0] to of the circuit module 300 and the terminals SCANI [0] to [2] of the circuit module 700 are connected to each other via test signal lines 500, respectively. For convenience, the bus signal lines 400 are represented by solid lines, and the test signal lines 500 are represented by dotted lines.

In the semiconductor integrated circuit 800A, an individual bus signal line 400 is sandwiched between shield lines 600A, and an individual test signal line 500 is also sandwiched between shield lines 600A. An individual shield line 600A is set to a constant potential level when the semiconductor integrated circuit 800A is set to the system mode or the scan mode. With the semiconductor integrated circuit 800A configured in this way, the crosstalk, between bus signal lines 400 is reduced in the system mode, and the crosstalk between test signal lines 500 is reduced in the scan mode.

However, with this semiconductor integrated circuit 800A, a total (maximum) of 19 line resources is needed to connect the circuit modules 300 and 700. More specifically, six bus signal lines 400, three test signal lines 500, and 10 shield lines 600A for sandwiching the bus signal lines 400 and the test signal lines 500 are needed.

In contrast, with the semiconductor integrated circuit 800 according to the fourth embodiment illustrated in FIG. 19, by adjacently arranging an individual bus signal line 400 and an individual test signal line 500 and by using the power supply lines 600a, the circuit modules 300 and 700 are connected to each other by a total of nine line resources. The semiconductor integrated circuit 800 achieves a better line property while using fewer line resources, compared with the semiconductor integrated circuit 800A.

Figure 21:
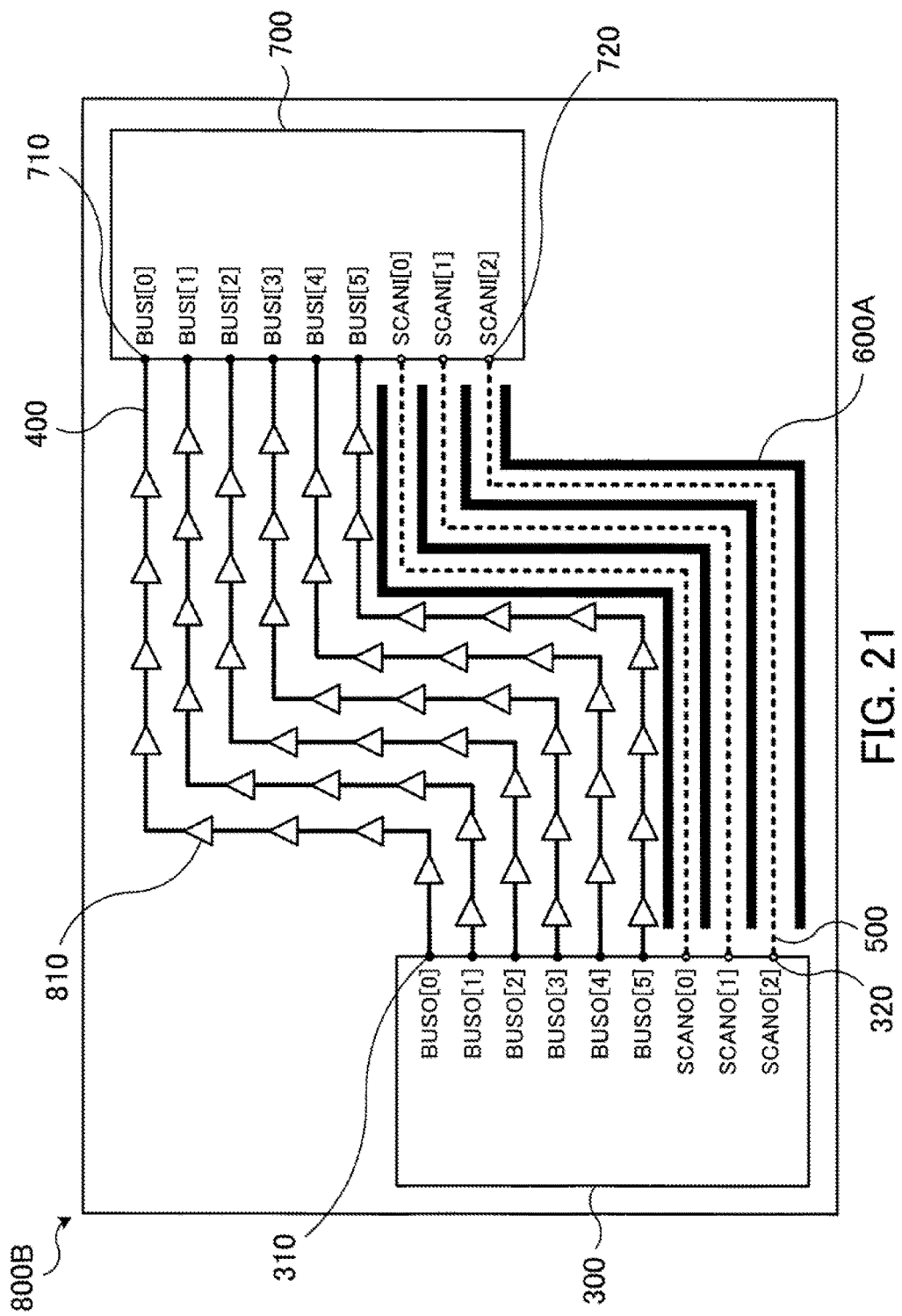
FIG. 21 illustrates a semiconductor integrated circuit according to a second comparative example.

FIG. 21 illustrates a semiconductor integrated circuit according to a second comparative example. FIG. 21 is a plan view of main portions of a semiconductor integrated circuit.

A semiconductor integrated circuit 800B illustrated in FIG. 21 is an example in which the crosstalk is reduced by inserting buffers 810 in an individual bus signal line 400. By inserting the buffers 810 as illustrated in FIG. 21, the number of shield lines 600A for sandwiching the bus signal lines 400 is reduced. For convenience, the bus signal lines 400 are represented by solid lines, and test signal lines 500 are represented by dotted lines.

However, to reduce the crosstalk by inserting the buffers 810 without using the shield lines 600A, a relatively large number of buffers 810 are needed. While the insertion of many buffers 810 enables reduction of the crosstalk and reduction of the number of shield lines 600A, the timing QoR could be deteriorated. In addition, while the number of shield lines 600A is reduced by inserting the buffers 810, a total (maximum) of 13 line resources are still needed as illustrated in FIG. 21.

Figure 22:
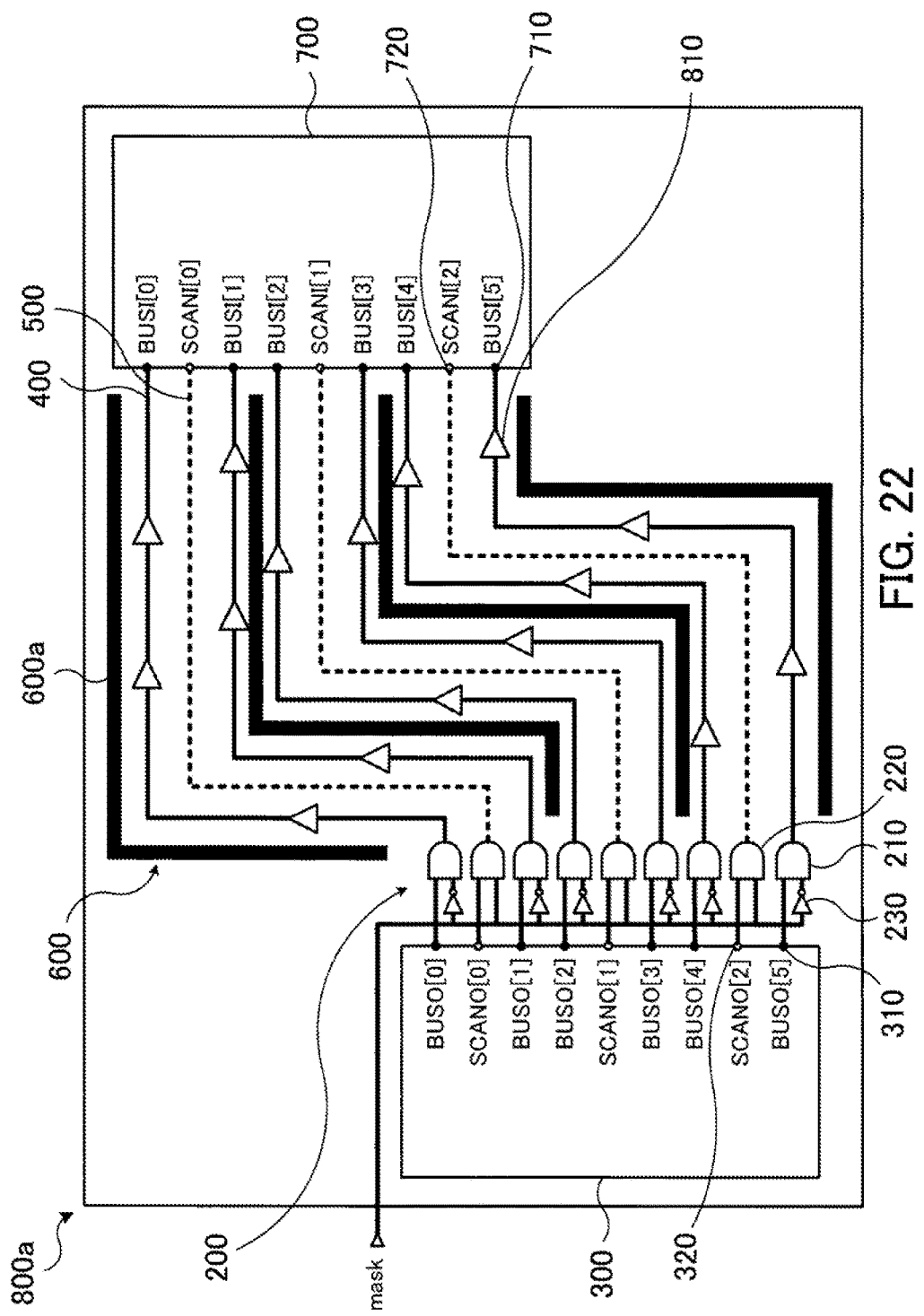
FIG. 22 illustrates a semiconductor integrated circuit according to a variation of the fourth embodiment.

FIG. 22 is a semiconductor integrated circuit according to a variation of the fourth embodiment. FIG. 22 is a plan view of main portions of a semiconductor integrated circuit according to a variation of the fourth embodiment.

The semiconductor integrated circuit 800a illustrated in FIG. 22 differs from the semiconductor integrated circuit 800 illustrated in FIG. 19 in that butters 810 are inserted in an individual bus signal line 400.

In the semiconductor integrated circuit 800a, by adjacently arranging an individual bus signal line 400 and an individual test signal line 500 and by using power supply lines 600a, the crosstalk is reduced. The crosstalk is reduced more effectively by inserting the buffers 810.

In the semiconductor integrated circuit 800a, since the crosstalk is reduced by adjacently arranging an individual bus signal line 400 and an individual test, signal line 500 and by using the power supply lines 600a, the number of buffers 810 inserted is less than that of the buffers inserted in the semiconductor integrated circuit 800B illustrated in FIG. 21. In addition, as described above, the circuit modules 300 and 700 are connected to each other by a total of nine line resources. Thus, the semiconductor integrated circuit 800a enables reduction of the crosstalk while ensuring a better line property and timing QoR.

Next, a fifth embodiment will be described.

Figure 23:
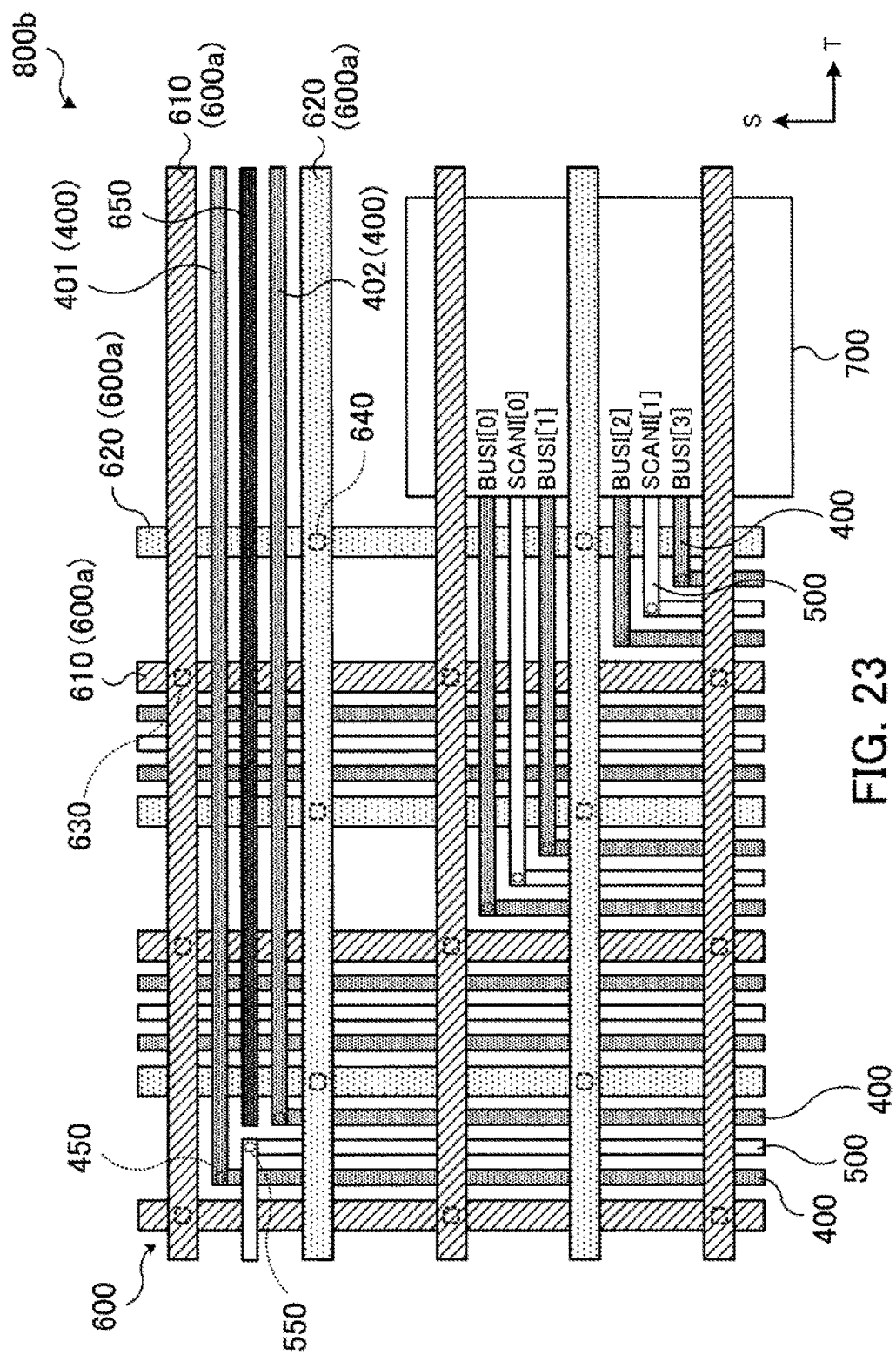
FIG. 23 illustrates an example of a semiconductor integrated circuit according to a fifth embodiment.

FIG. 23 illustrates an example of a semiconductor integrated circuit according to the fifth embodiment. FIG. 23 is a plan view of main portions of an example of a semiconductor integrated circuit according to the fifth embodiment.

A semiconductor integrated circuit 800b illustrated in FIG. 23 differs from the semiconductor integrated circuit 800 according to the fourth embodiment (FIGS. 17 to 19) in that a shield line 650 is arranged between bus signal lines 400 (bus signal lines 401 and 402).

For example, there are cases in which a test signal line 500 cannot be arranged between a bus signal line 401 and a bus signal line 402, depending on the arrangement of a group of circuit modules, the number of terminals of the circuit modules, or the terminal locations of the circuit modules. Namely, there are cases in which a bus signal line 401 and a bus signal line 402 are arranged adjacent to each other. In such cases, as in the semiconductor integrated circuit 800b, a shield line 650 is arranged between a bus signal line 401 and a bus signal line 402. The shield line 650 is fixed at a constant potential level when the semiconductor integrated circuit 800b is in the system mode and the scan mode.

With the semiconductor integrated circuit. 800b, in the system mode, for example, a bus signal line 401 is sandwiched between a VDD line 610 and a shield line 650, and a bus signal line 402 is sandwiched between a VSS line 620 and the shield line 650. In this way, the crosstalk between the bus signal lines 401 and 402 is reduced, While, as an example, a shield line 650 is arranged between bus signal lines 400, a shield line 650 may be arranged between test signal lines 500.

Next, a sixth embodiment, will be described.

Figure 24:
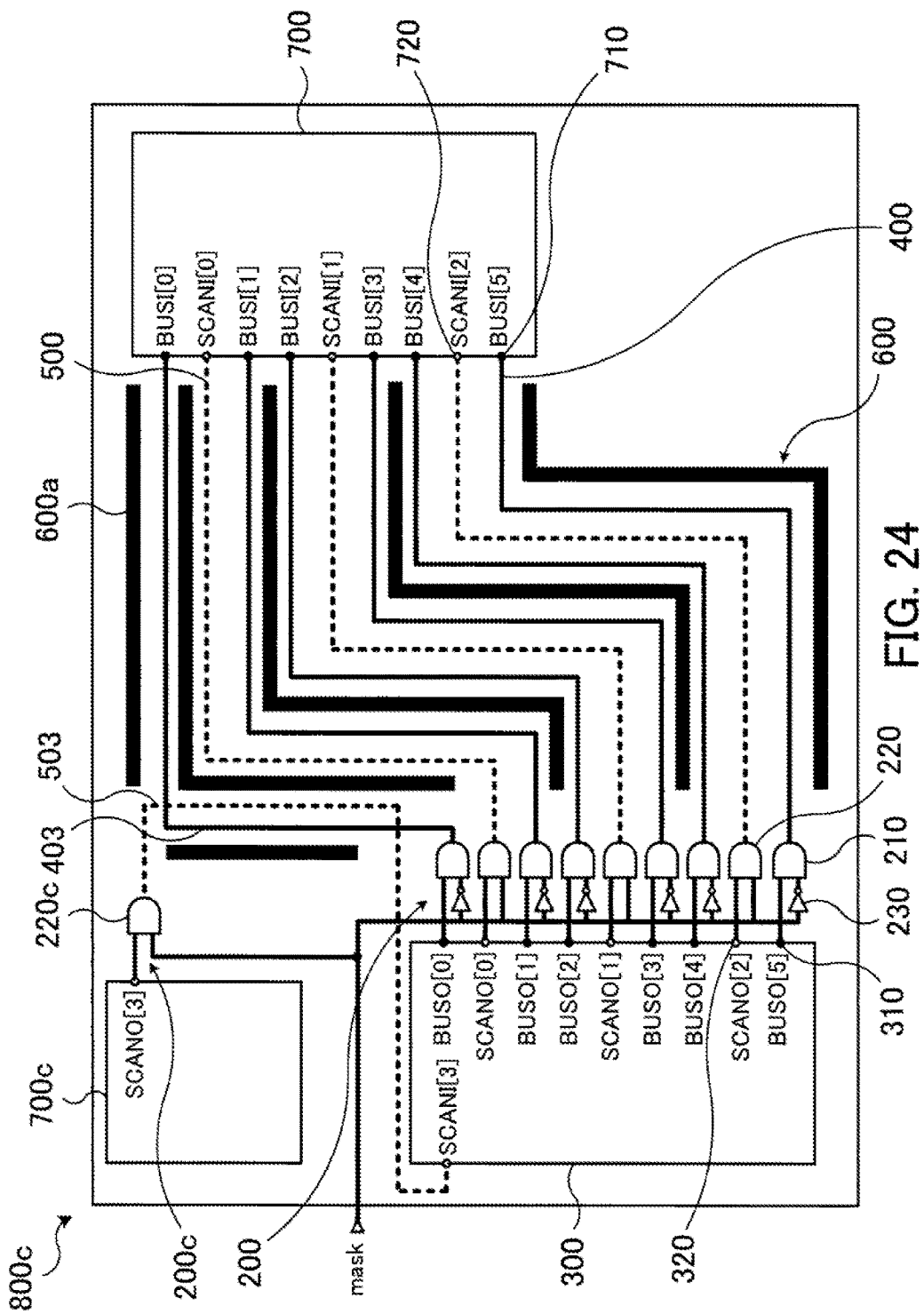
FIG. 24 illustrates an example of a semiconductor integrated circuit according to a sixth embodiment.

FIG. 24 illustrates an example of a semiconductor integrated circuit according to the sixth embodiment. FIG. 24 is a plan view of main portions of an example of a semiconductor integrated circuit according to the sixth embodiment.

In the above fourth embodiment, an individual bus signal line 400 and an individual test signal line 500 are arranged adjacent to each other between the circuit modules 300 and 700. However, the sixth embodiment is directed to a different configuration.

For example, in a semiconductor integrated circuit 800c illustrated in FIG. 24, a test signal line 500 extending between a circuit module 700c and a circuit module 300 is arranged adjacent to a bus signal line 400 extending between the circuit module 300 and a circuit module 700. More specifically, a test signal line 503 connecting a terminal SCANO[3] of the circuit module 700c and a terminal SCANI[3] of the circuit module 300 is arranged adjacent to a part of a bus signal line 403 connecting a terminal BUSO[0] of the circuit module 300 and a terminal BUSI[0] of the circuit module 700. For example, the test signal line 503 is connected to the output terminal of an AND gate 220c of a mode switching unit 200c arranged near the circuit module 700c. The AND gate 220c receives a mask signal mask and an output signal from the terminal SCANO[3].

Thus, in the semiconductor integrated circuit 800c, the bus signal line 403 extending between the circuit modules 300 and 700 is sandwiched between the test signal line 503 extending between the circuit modules 700c and 300 and a power supply line 600a. In this way, in the system mode, the crosstalk involving the bus signal line 403 is reduced by the test signal line 503 and the power supply line 600a.

In FIG. 24, while the bus signal line 403 extending between the circuit modules 300 and 700 is used as an example, a test signal line 500 or another bus signal line 400 extending between the circuit modules 300 and 700 may also be sandwiched by suitable signal lines. Namely, a signal line may be arranged adjacent to another signal line extending to another circuit module.

Next, a seventh embodiment will be described.

The logic circuit of the above mode switching unit 200 may be changed after a power mesh 600, the bus signal lines 400, and the test signal lines 500 are arranged.

Figure 25A:
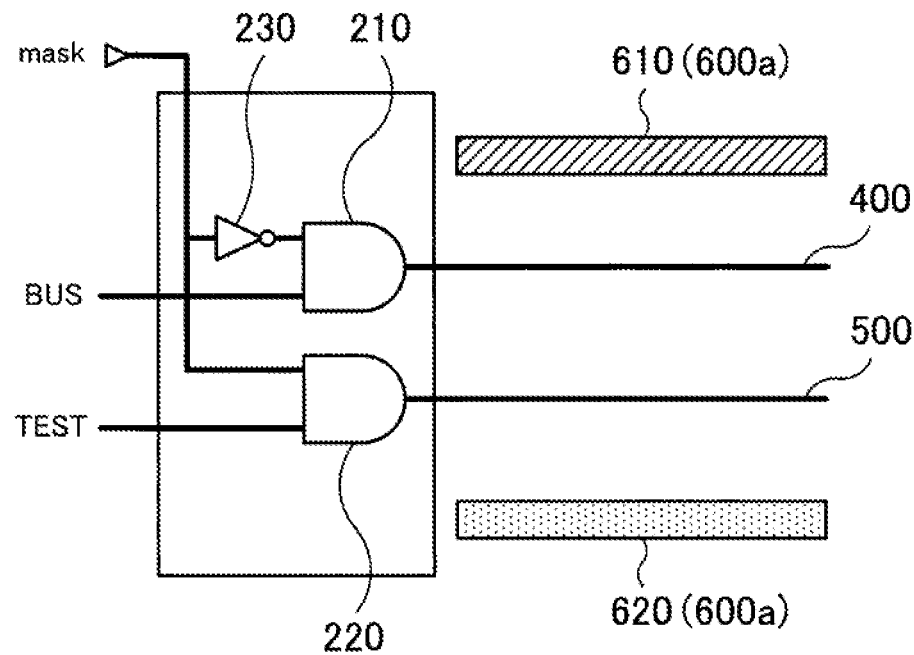
FIGS. 25A and 25B illustrate processing for changing the logic circuit of a mode switching unit according to a seventh embodiment.
Figure 25B:
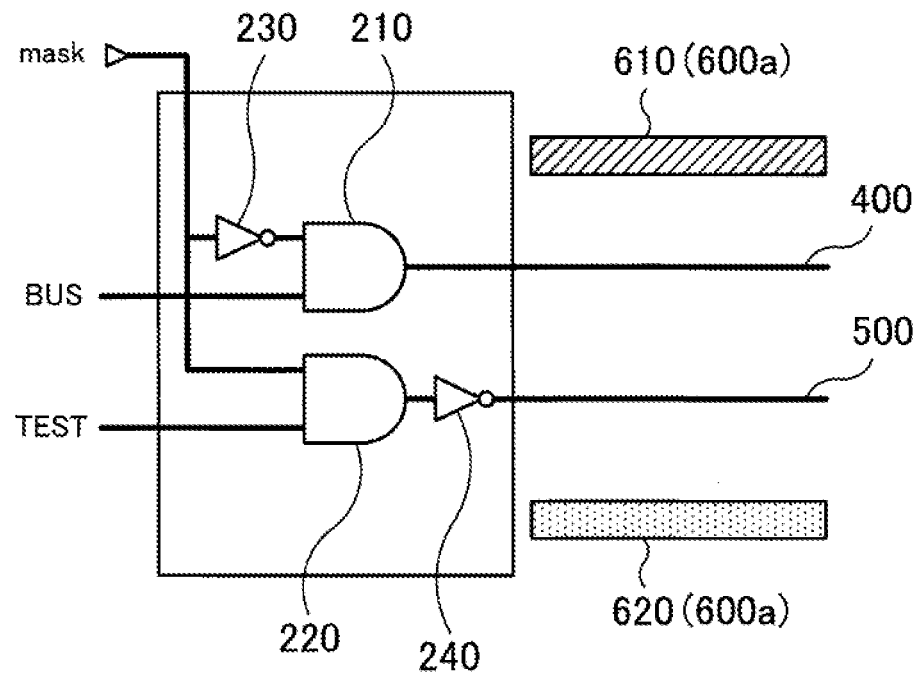

FIGS. 25A and 25B illustrate processing for changing the logic circuit of a mode switching unit according to a seventh embodiment.

The following description assumes that a semiconductor integrated circuit obtained by using the method according to the fourth embodiment includes a VDD line 610, a bus signal line 400, a test signal line 500, and a VSS line 620 arranged as illustrated in FIG. 25A, for example. The bus signal line 400 is connected to the output terminal of an AND gate 210 of a mode switching unit 200, and the test signal line 500 is connected to the output terminal of an AND gate 220 of the mode switching unit 200.

For example, when the semiconductor integrated circuit configured in this way is set to the system mode by setting a mask signal mask at the L level, the logic level of the test signal line 500 is fixed at the L level. In this state, the bus signal line 400 is sandwiched between the H-level VDD line 610 and the L-level test signal line 500. In this state, the signal transmitted through the bus signal line 400 could be affected by the electric field generated between the VDD line 610 and the test signal line 500 at the different potential levels.

To avoid this possibility, for example, as illustrated in FIG. 25B, an inverter 240 is connected to the output terminal of the AND gate 220 of the mode switching unit 200, and the test signal line 500 is connected to the output terminal of the inverter 240. This change made to the mode switching unit 200 fixes the logic level of the test signal line 500 at the H level when the semiconductor integrated circuit receives an L-level mask signal mask and is set to the system mode. In this way, in the system mode, since the bus signal line 400 is sandwiched between the VDD line 610 and the test signal line 500 at the same potential level, the signal transmitted through the bus signal line 400 is less affected by the above electric field.

When the inverter 240 is connected to the output terminal of the AND gate 220, the signal transmitted through the test signal line 500 is inverted in the test mode. Thus, an inverter may be connected to the input-side circuit module, for example.

In addition, when the mode switching unit 200 includes a logic circuit that fixes the logic level of the bus signal line 400 at the H level in the test mode, the logic circuit may also be changed so that the logic level of the bus signal line 4 00 is fixed at the L level to match the potential level of the VSS line 620.

Figure 26:
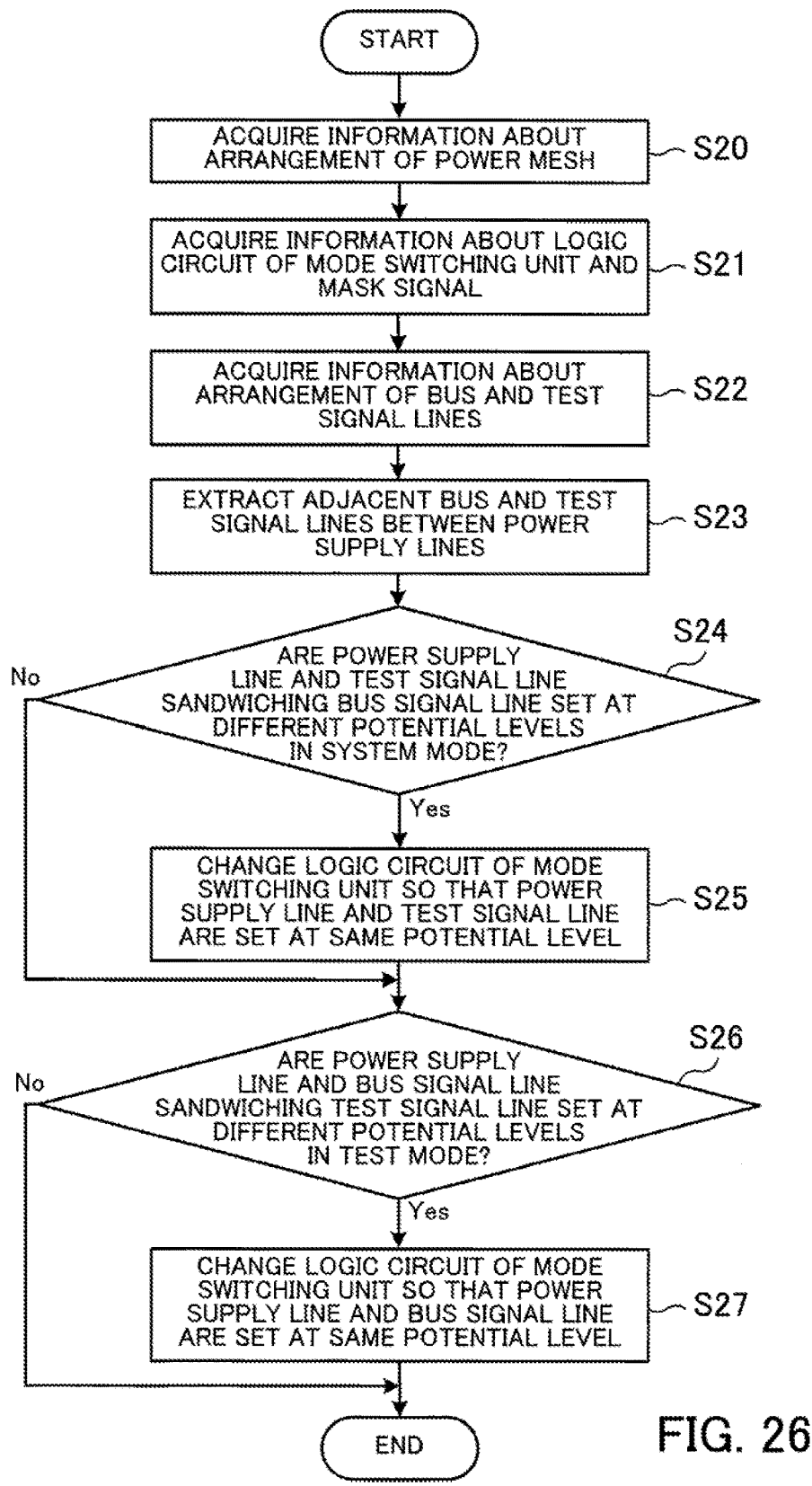
FIG. 26 illustrates an example of a flowchart of the processing for changing the logic circuit of a mode switching unit according to the seventh embodiment.

When the logic circuit of the mode switching unit 200 is changed as described above so that a signal line is fixed at a potential level in accordance with the potential level of a power supply line 600a (VDD line 610 or VSS line 620), the following processing as illustrated in FIG. 26 is performed, for example.

FIG. 26 illustrates an example of a flowchart of the processing for changing the logic circuit of a mode switching unit, according to the seventh embodiment.

For example, after step S17 (FIG. 9) in the design method (FIGS. 8 and 9) according to the fourth embodiment, the processing as illustrated in FIG. 26 is performed.

First, the information about the arrangement of the power mesh 600 obtained in step S8 is acquired (step S20; FIG. 26). Next, the information about the logic circuit of the mode switching unit 200 and the mask signal mask obtained in steps S6 and S7 is acquired (step S21; FIG. 26). Next, the Information about the arrangement of the bus signal lines 400 and the test signal lines 500 obtained in step S14 is acquired (step S22; FIG. 26).

By using the acquired information about the arrangement of the power mesh 600, the bus signal lines 400, and the test signal lines 500, a bus signal line 400 and a test signal line 500 adjacent to each other between a pair of power supply lines 600a (between VDD and VSS lines) is extracted (step S23; FIG. 26).

Next, it is determined whether the power supply line 600a and the test signal line 500 sandwiching the bus signal line 400 are set at different potential levels in the system mode (step S24; FIG. 26). If the power supply line 600a and the test signal line 500 are set at different potential levels, the logic circuit of the mode switching unit 200 connected to the test signal line 500 is changed so that the logic level of the test signal line 500 is fixed at the same potential level as that of the power supply line 600a in the system mode (step S25; FIG. 26).

In addition, it is determined that the power supply line 600a and the bus signal line 400 sandwiching the test signal line 500 are set at different potential levels in the test mode (step S26; FIG. 26). If the power supply line 600a and the bus signal line 400 are set at different potential levels, the logic circuit of the mode switching unit 200 connected to the bus signal line 400 is changed so that the logic level of the bus signal line 400 is fixed at the same potential level as the power supply line 600a in the test mode (step S27; FIG. 26).

The processing in steps S26 and S27 may be performed before steps S24 and S25. Alternatively, steps S26 and S27 and steps S24 and S25 may be performed simultaneously.

The logic circuit of the mode switching unit 200 is changed in accordance with the above processing. In the above example, the processing is performed after step S17 in FIG. 9. However, for example, the processing may be performed before step S17 or after step S18.

A computer may be used for designing the above semiconductor integrated circuit.

Figure 27:
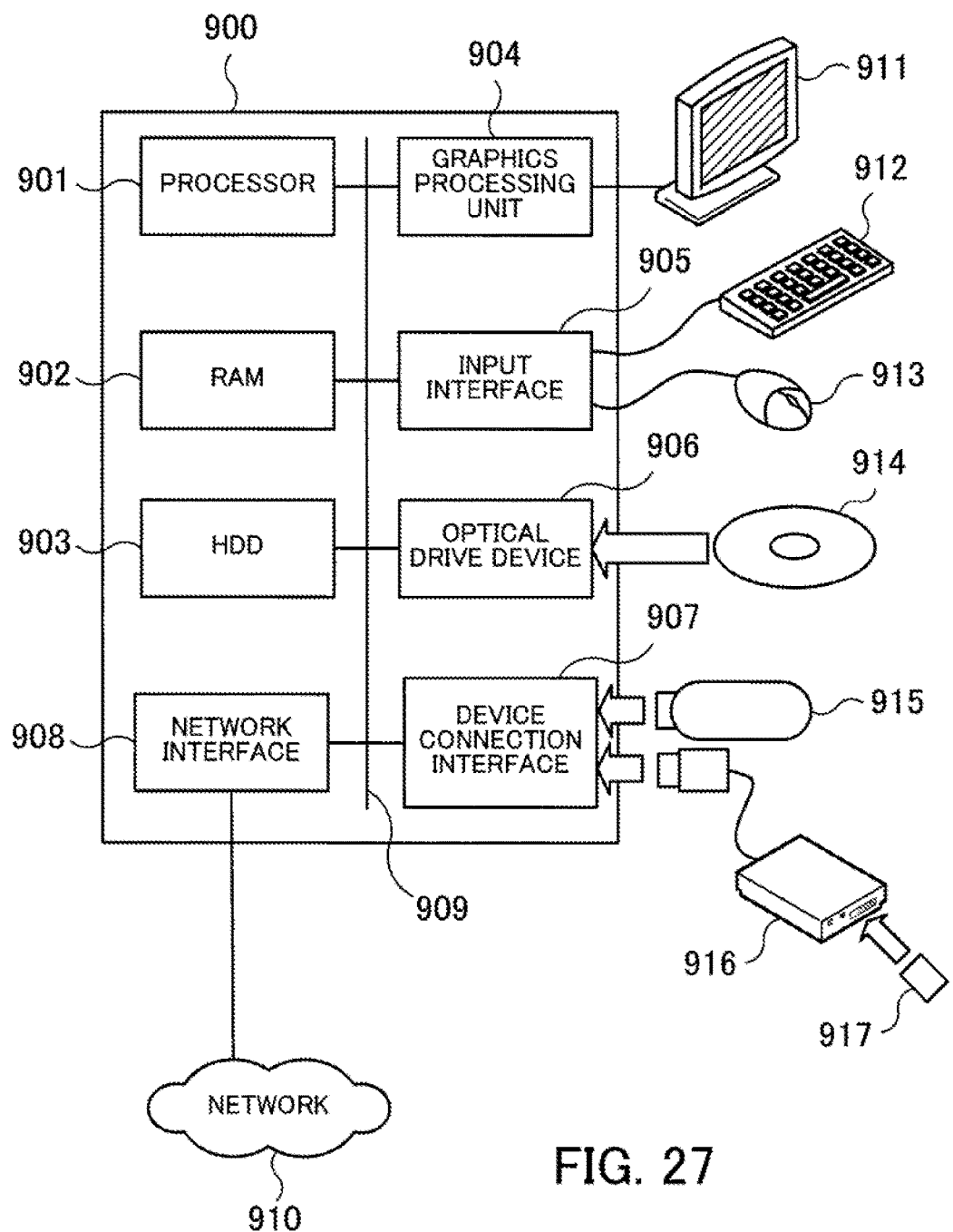
FIG. 27 illustrates a hardware example of a computer.

FIG. 27 illustrates a hardware example of a computer.

A processor 901 comprehensively controls a computer 900. The processor 901 is connected to a random access memory (RAM) 902 and a plurality of peripheral devices via a bus 909. The processor 901 may be a multiprocessor. The processor 901 may be a central processing unit (CPU), a micro processing unit (MPU), a digital signal processor (DSP), an application specific integrated circuit (ASIC), a programmable logic device (PLD), or the like. The processor 901 may be a combination of at least two of a CPU, an MPU, a DSP, an ASIC, and a PLD.

The RAM 902 is used as a main storage device of the computer 900. The RAM 902 temporarily holds at least a part of an operating system (OS) program and an application program executed by the processor 901. In addition, the RAM 902 holds various kinds of data needed for processing performed by the processor 901.

Examples of the peripheral devices connected to the bus 909 include a hard disk drive (HDD) 903, a graphics processing unit 904, an input interface 905, an optical drive device 906, a device connection interface 907, and a network interface 908.

The HDD 903 magnetically reads and writes data on its internal disk. The HDD 903 is used as an auxiliary storage device of the computer 900. The HDD 903 holds OS programs, application programs, and various kinds of data. A semiconductor memory device such as a flash memory may be used as the auxiliary storage device.

The graphics processing unit 904 is connected to a monitor 911. The graphics processing unit 904 displays an image on a screen of the monitor 911 in accordance with an instruction from the processor 901. Examples of the monitor 911 include a display device using a cathode ray tube (CRT) and a liquid crystal display.

The input interface 905 is connected to a keyboard 912 and a mouse 913, The input interface 905 transmits signals from the keyboard 912 and the mouse 913 to the processor 901. The mouse 913 is an example of a pointing device. Another pointing device such as a touch panel, a tablet, a touchpad, or a trackball may also be used.

The optical drive device 906 reads data stored in an optical disc 914 by using laser light or the like. The optical disc 914 is a portable storage medium in which data readable by light reflection is recorded. Examples of the optical disc 914 include a digital versatile disc (DVD), a DVD-RAM, a compact disc read-only memory (CD-ROM), and a CD-R (Recordable)/RW (Rewritable).

The device connection interface 907 is a communication interface for connecting peripheral devices to the computer 900. A memory device 915 or a memory reader and writer 916 can be connected to the device connection interface 907, The memory device 915 is a storage medium having a function of communicating with the device connection interface 907. The memory reader and writer 916 is a device for reading and writing data on the memory card 917, The memory card 917 is a card storage medium.

The network interface 908 is connected to a network 910. The network interface 908 exchanges data with another computer or communication device via the network 910.

By using the computer 900 having the above hardware configuration, various kinds of processing performed in designing the semiconductor integrated circuits according to the first to seventh embodiments may be realized, and various kinds of processing performed by a design device used for the designing may be realized.

For example, by performing a program stored in a computer-readable storage medium, the computer 900 realizes various kinds of processing performed in designing the above semiconductor integrated circuits. The program in which processing contents performed by the computer 900 are written may be stored in various storage media. For example, the program performed by the computer 900 may be stored in the HDD 903. The processor 901 loads at least a part of the program in the HDD 903 to the RAM 902 and performs the loaded program. In addition, the program performed by the computer 900 may be stored in a portable storage medium such as the optical disc 914, the memory device 915, or the memory card 917. For example, the program stored in the portable storage medium may be performed after the program is installed in the HDD 903 in accordance with a control instruction from the processor 901. Alternatively, the processor 901 may directly read the program from the portable storage medium and perform the read program.

The semiconductor integrated circuits according to the above first to seventh embodiments may be used in various kinds of electronic apparatus or device, such as semiconductor packages, computers (personal computers, supercomputers, servers, etc.), smartphones, mobile phones, tablet terminals, sensors, cameras, audio devices, measurement devices, inspection devices, manufacturing apparatuses. The above first to seventh embodiments provide high-performance and high-quality semiconductor integrated circuits that enable reduction of the crosstalk in both the system and scan modes while ensuring a better line property and timing QoR. By using these semiconductor integrated circuits, various kinds of high-performance and high-quality electronic apparatus or device are realized.

The technique discussed herein realizes high-performance and high-quality semiconductor integrated circuits that enable reduction of the crosstalk in the system mode and the scan mode.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A semiconductor integrated circuit comprising:
   a first bus signal line; and
   a first test signal line arranged adjacent to the first bus signal line,
   wherein the semiconductor integrated circuit includes a system mode, which is an operation mode that uses the first bus signal line, and a scan mode, which is an operation mode that uses the first test signal line, and
   wherein a logic level of the first test signal line is fixed in the system mode, and a logic level of the first bus signal line is fixed in the scan mode.

2. The semiconductor integrated circuit according to claim 1, further comprising a mode switching unit configured to fix, based on a first input signal, the logic level of the first test signal line in the system mode and the logic level of the first bus signal line in the scan mode.

3. The semiconductor integrated circuit according to claim 1, further comprising a first power supply line arranged adjacent to the first bus signal line on a side opposite the first test signal line.

4. The semiconductor integrated circuit according to claim 1, further comprising a second power supply line arranged adjacent to the first test signal line on a side opposite to the first bus signal line.

5. The semiconductor integrated circuit according to claim 1, further comprising a second test signal line arranged adjacent to the first bus signal line on a side opposite the first test signal line,
   wherein the scan mode is an operation mode that uses the first test signal line and the second test signal line, and
   wherein the logic level of the first test signal line and a logic level of the second test signal line are fixed in the system mode.

6. The semiconductor integrated circuit according to claim 5, further comprising a mode switching unit configured to fix, based on a first input signal, the logic level of the first test signal line and the logic level of the second test signal line in the system mode and the logic level of the first bus signal line in the scan mode.

7. The semiconductor integrated circuit according to claim 1, further comprising a second bus signal line arranged adjacent to the first test signal line on a side opposite the first bus signal line,
   wherein the system mode is an operation mode that uses the first bus signal line and the second bus signal line, and wherein the logic level of the first bus signal line and a logic level of the second bus signal line are fixed in the scan mode.

8. The semiconductor integrated circuit according to claim 7, further comprising a mode switching unit configured to fix, based on a first input signal, the logic level of the first test signal line in the system mode and the logic level of the first bus signal line and the logic level of the second bus signal line in the scan mode.

9. The semiconductor integrated circuit according to claim 2, wherein the mode switching unit comprises a first AND gate connected to the first bus signal line, an inverter connected to the first AND gate, and a second AND gate connected to the first test signal line.

10. A semiconductor integrated circuit design method comprising:
arranging a circuit module;
arranging a mode switching unit connected to the circuit module; and
arranging a first bus signal line connected to the mode switching unit and a first test signal line connected to the mode switching unit and adjacent to the first bus signal line,
wherein, based on a first input signal, the mode switching unit fixes a logic level of the first test signal line in a system mode, which is an operation mode that uses the first bus signal line, and fixes a logic level of the first bus signal line in a scan mode, which is an operation mode that uses the first test signal line.

11. The semiconductor integrated circuit design method according to claim 10, wherein the arranging a mode switching unit includes arranging the mode switching unit near or inside the circuit module.

12. The semiconductor integrated circuit design method according to claim 10, further comprising arranging a first power supply line and a second power supply line adjacent to the first power supply line,
wherein the first bus signal line and the first test signal line are arranged between the first and second power supply lines.

13. The semiconductor integrated circuit design method according to claim 10, further comprising arranging a second test signal line connected to the mode switching unit and adjacent to the first bus signal line on a side opposite the first test signal line,
wherein, based on the first input signal, the mode switching unit fixes the logic level of the first test signal line and a logic level of the second test signal line in the system mode.

14. The semiconductor integrated circuit design method according to claim 10, further comprising arranging a second bus signal line connected to the mode switching unit and adjacent to the first test signal line on a side opposite the first bus signal line,
wherein, based on the first input signal, the mode switching unit fixes the logic level of the first bus signal line and a logic level of the second bus signal line in the scan mode.

15. The semiconductor integrated circuit design method according to claim 10, wherein the arranging of the mode switching unit includes arranging a first AND gate connected to the first bus signal line, an inverter connected to the first AND gate, and a second AND gate connected to the first test signal line, inside the mode switching unit.

* * * * *